United States Patent
Kim et al.

(10) Patent No.: US 10,394,371 B2
(45) Date of Patent: Aug. 27, 2019

(54) METHOD FOR CONTROLLING CONTENT AND ELECTRONIC DEVICE THEREOF

(71) Applicant: Samsung Electronics Co., Ltd., Suwon-si, Gyeonggi-do (KR)

(72) Inventors: Jiwon Kim, Seoul (KR); Sungyoun An, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 15/375,805

(22) Filed: Dec. 12, 2016

(65) Prior Publication Data

US 2017/0185215 A1    Jun. 29, 2017

(30) Foreign Application Priority Data

Dec. 28, 2015 (KR) .................. 10-2015-0187810

(51) Int. Cl.
| | | |
|---|---|---|
| *G06F 3/041* | (2006.01) | |
| *G06F 3/0488* | (2013.01) | |
| *G06F 3/0487* | (2013.01) | |
| *G06F 1/16* | (2006.01) | |
| *G06F 3/0346* | (2013.01) | |

(52) U.S. Cl.
CPC .......... *G06F 3/0416* (2013.01); *G06F 1/1643* (2013.01); *G06F 1/1652* (2013.01); *G06F 1/1694* (2013.01); *G06F 3/0346* (2013.01); *G06F 3/0487* (2013.01); *G06F 3/04883* (2013.01); *G06F 2203/04102* (2013.01); *G06F 2203/04803* (2013.01); *G06F 2203/04806* (2013.01)

(58) Field of Classification Search
CPC ......... G06F 2203/04806; G06F 3/0416; G06F 3/044; G06F 3/041; G06F 3/03; G06F 3/00; G06F 2203/04102; G06F 2203/04803; G06F 2203/04804; G06F 3/0485; G06F 1/1649; G06F 1/11641; G06F 1/1643; G06F 1/1652; G06F 1/1694; G06F 3/0346; G06F 3/0487; G06F 3/04883
See application file for complete search history.

(56) References Cited

U.S. PATENT DOCUMENTS

2009/0070670 A1* 3/2009 Kishi ................. G06F 3/04886
715/702
2009/0091547 A1* 4/2009 Kikuoka ............. G06F 3/04886
345/173

(Continued)

OTHER PUBLICATIONS

EP Search Report dated Oct. 16, 2018 issued in EP Application No. 16882006.6.

*Primary Examiner* — Julie Anne Watko
(74) *Attorney, Agent, or Firm* — Jefferson IP Law, LLP

(57) ABSTRACT

An electronic device is provided. The electronic device includes a display, a sensor and at least one processor configured to display content on the display, detect rotation information of the electronic device upon detecting shape change information of the display through the sensor, determine control information based on the rotation information of the electronic device, generate additional content corresponding to the content based on the control information, and display the content and the additional content on different display areas of the display.

13 Claims, 24 Drawing Sheets

(56) References Cited

U.S. PATENT DOCUMENTS

| | | | |
|---|---|---|---|
| 2009/0298547 A1* | 12/2009 | Kim | G06F 1/162 |
| | | | 455/566 |
| 2010/0164888 A1* | 7/2010 | Okumura | G06F 1/1626 |
| | | | 345/173 |
| 2010/0302179 A1 | 12/2010 | Ahn et al. | |
| 2011/0169749 A1* | 7/2011 | Ganey | G06F 1/1626 |
| | | | 345/173 |
| 2012/0133621 A1* | 5/2012 | Kim | H04M 1/0206 |
| | | | 345/204 |
| 2013/0005469 A1 | 1/2013 | Selim | |
| 2013/0215041 A1* | 8/2013 | Kim | G06F 3/0487 |
| | | | 345/173 |
| 2013/0300732 A1* | 11/2013 | Hosoya | G06F 1/1652 |
| | | | 345/419 |
| 2013/0321340 A1* | 12/2013 | Seo | G06F 1/1641 |
| | | | 345/174 |
| 2014/0015743 A1* | 1/2014 | Seo | G06F 1/1694 |
| | | | 345/156 |
| 2014/0049463 A1* | 2/2014 | Seo | G06F 3/0487 |
| | | | 345/156 |
| 2014/0049464 A1* | 2/2014 | Kwak | G06F 3/0487 |
| | | | 345/156 |
| 2014/0054438 A1* | 2/2014 | Yun | G06F 1/1652 |
| | | | 248/550 |
| 2014/0098028 A1* | 4/2014 | Kwak | G09G 5/00 |
| | | | 345/173 |
| 2014/0152576 A1* | 6/2014 | Kim | G06F 3/03545 |
| | | | 345/169 |
| 2014/0282059 A1* | 9/2014 | Oh | G06F 1/1641 |
| | | | 715/744 |
| 2015/0042674 A1* | 2/2015 | Lin | G09G 5/14 |
| | | | 345/619 |
| 2015/0143238 A1* | 5/2015 | Jung | G06F 3/04817 |
| | | | 715/708 |
| 2015/0144920 A1* | 5/2015 | Yamazaki | H01L 27/323 |
| | | | 257/40 |
| 2015/0227225 A1* | 8/2015 | Park | G06F 1/1641 |
| | | | 345/173 |
| 2016/0026219 A1* | 1/2016 | Kim | H04M 1/0245 |
| | | | 345/173 |
| 2016/0048170 A1* | 2/2016 | Kim | G06F 3/0414 |
| | | | 345/173 |
| 2016/0098063 A1* | 4/2016 | Lee | G06F 1/1641 |
| | | | 345/659 |
| 2016/0109969 A1* | 4/2016 | Keating | G06F 3/03547 |
| | | | 345/173 |
| 2016/0291762 A1* | 10/2016 | Kim | G06F 3/0488 |
| 2016/0357221 A1* | 12/2016 | Huh | G06F 1/1652 |
| 2018/0181233 A1* | 6/2018 | Li | G06F 3/01 |

* cited by examiner

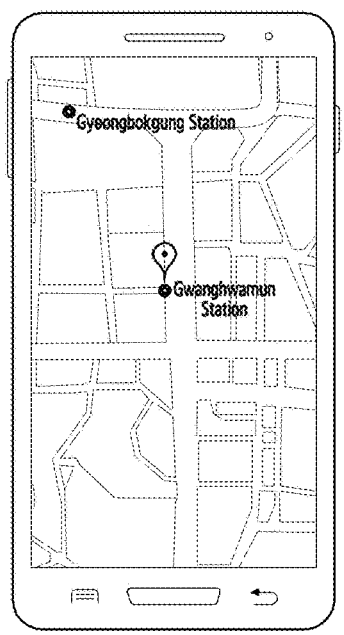
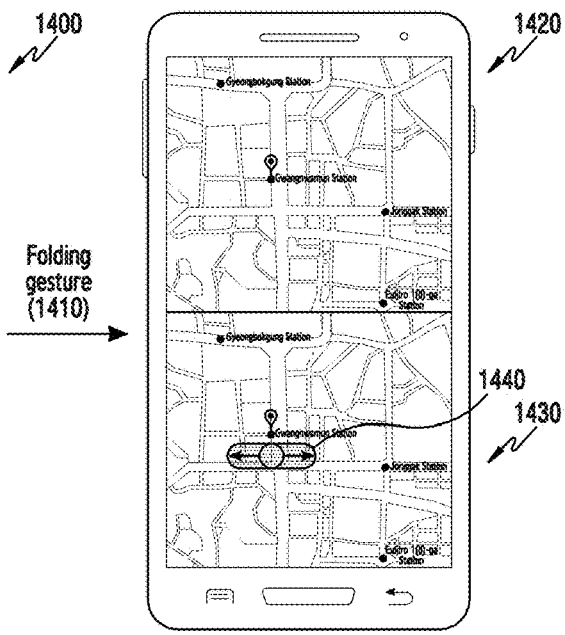
FIG.14A  FIG.14B
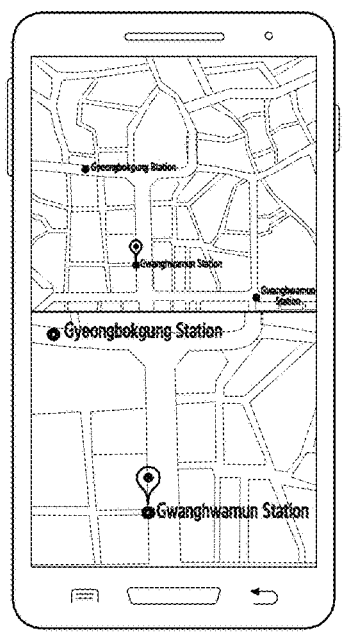
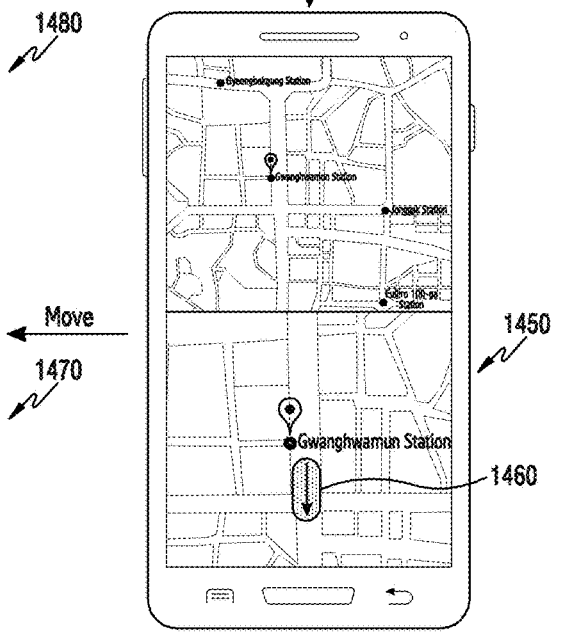
FIG.14D  FIG.14C

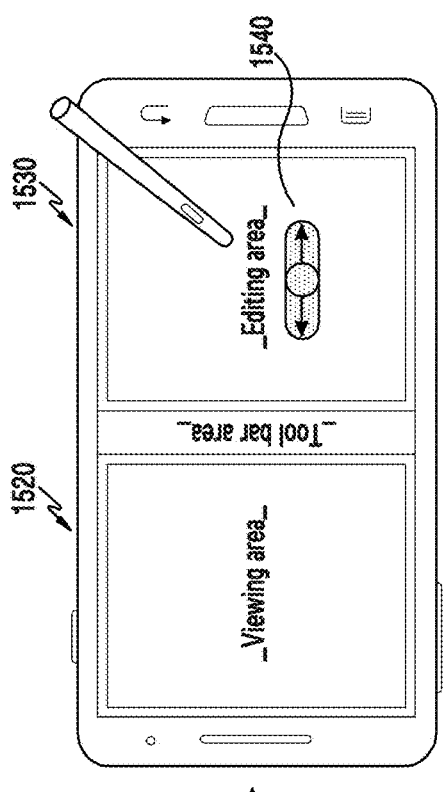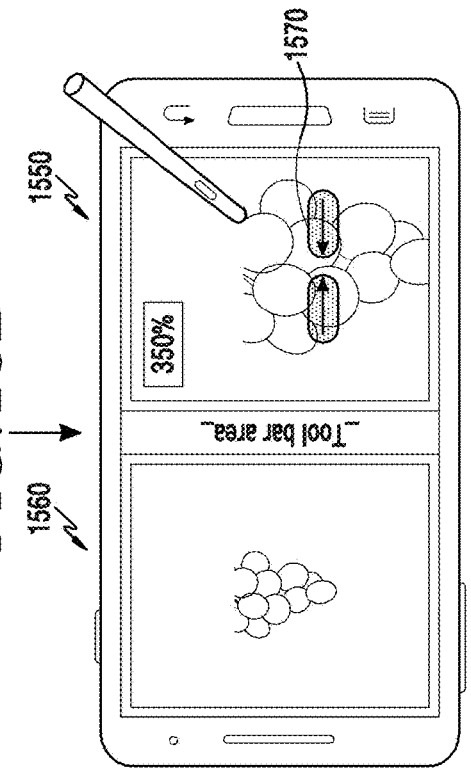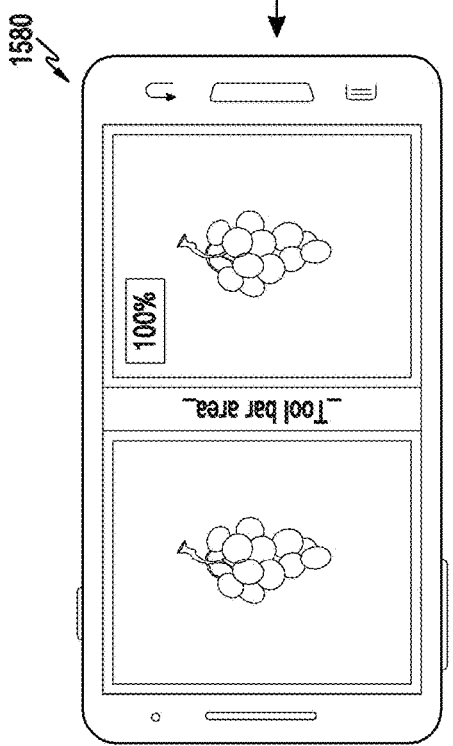

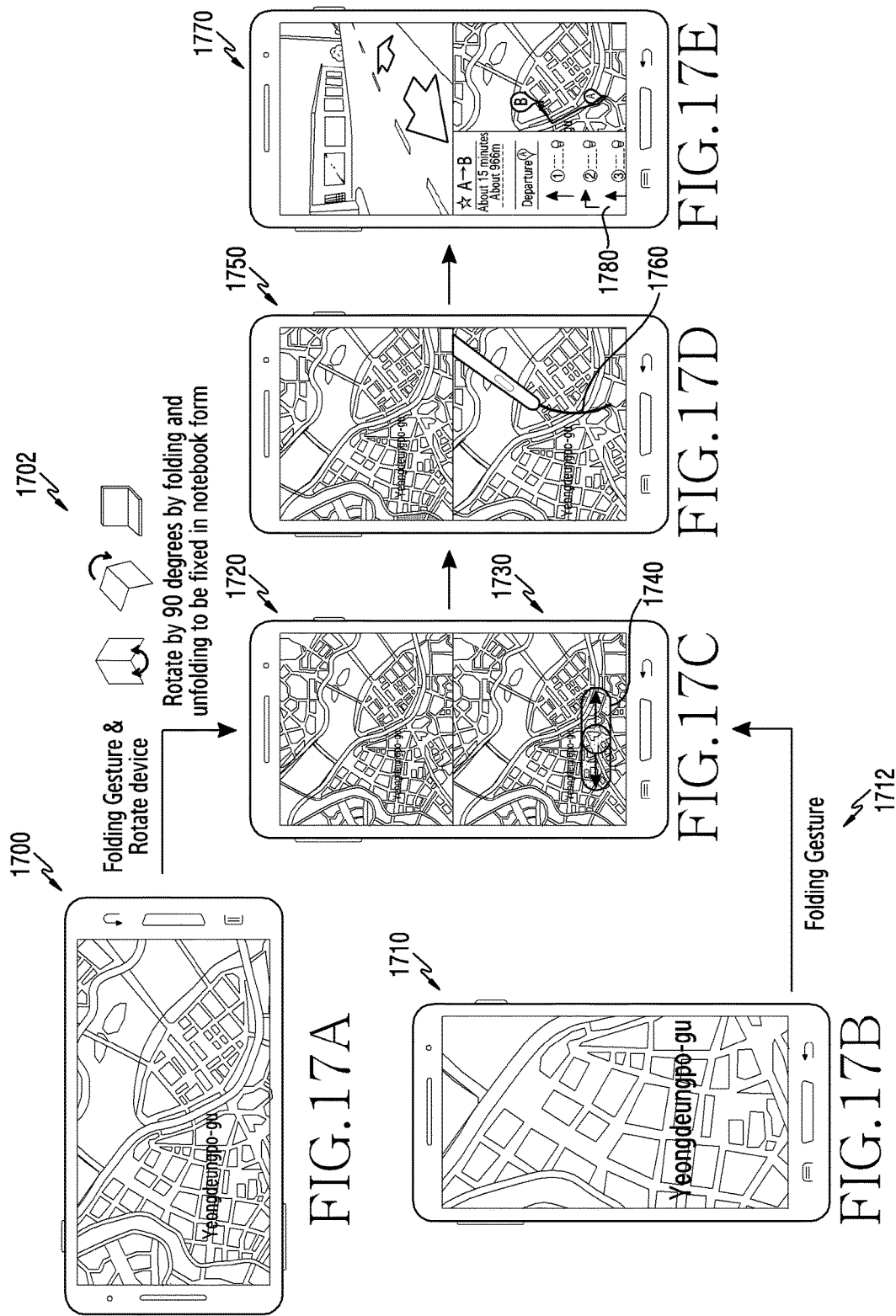

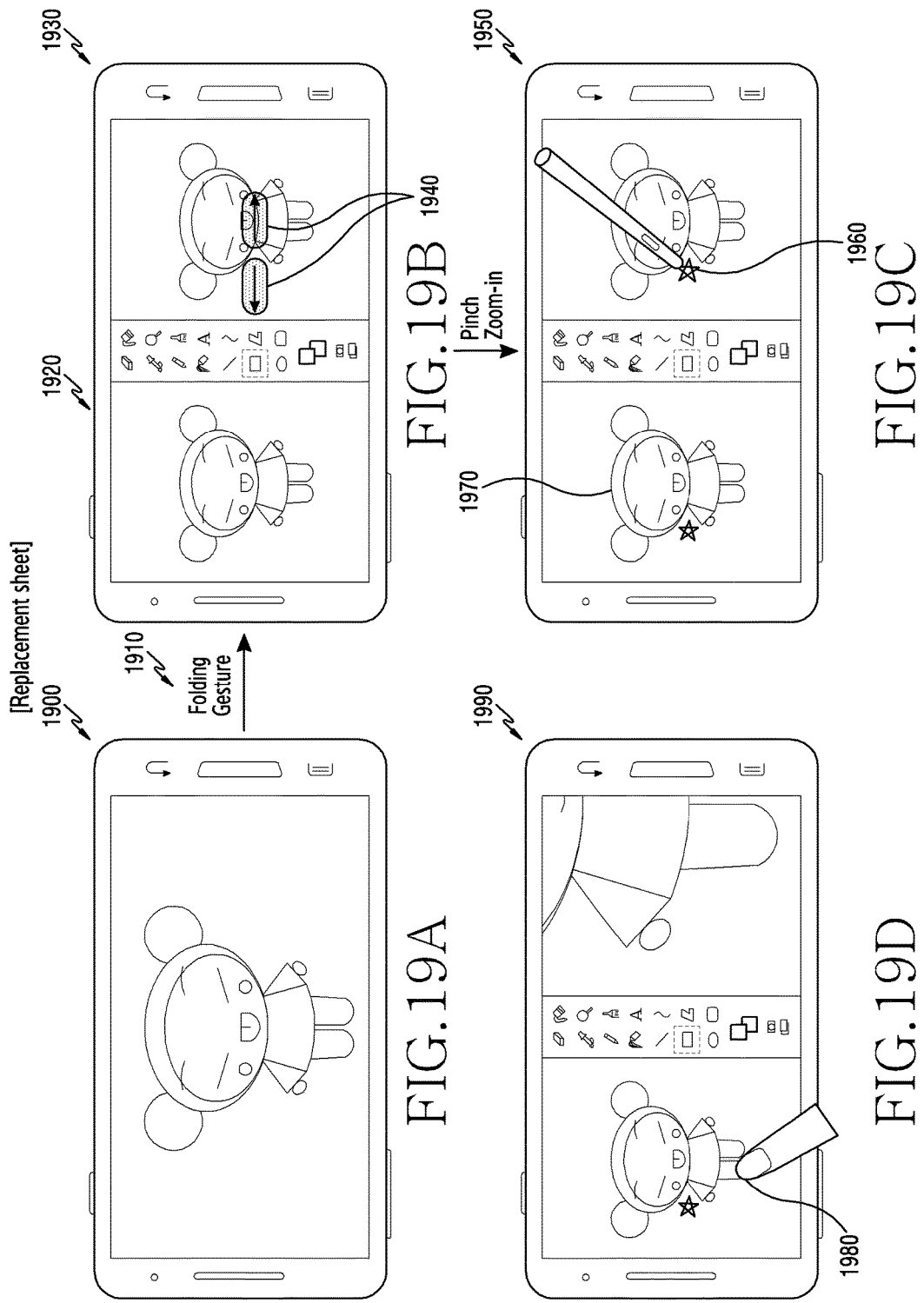

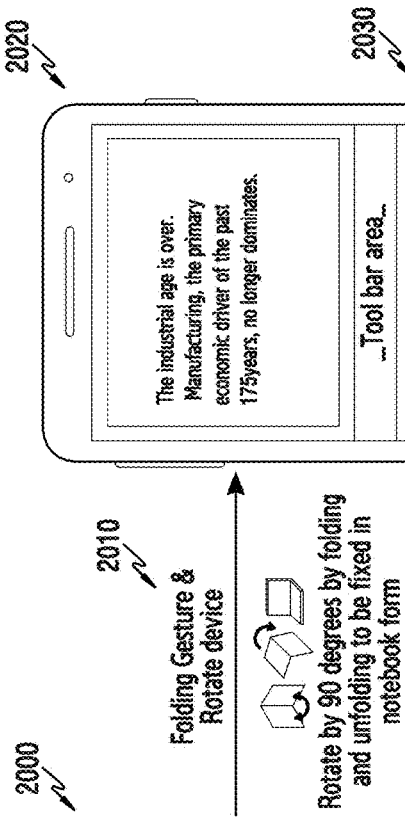
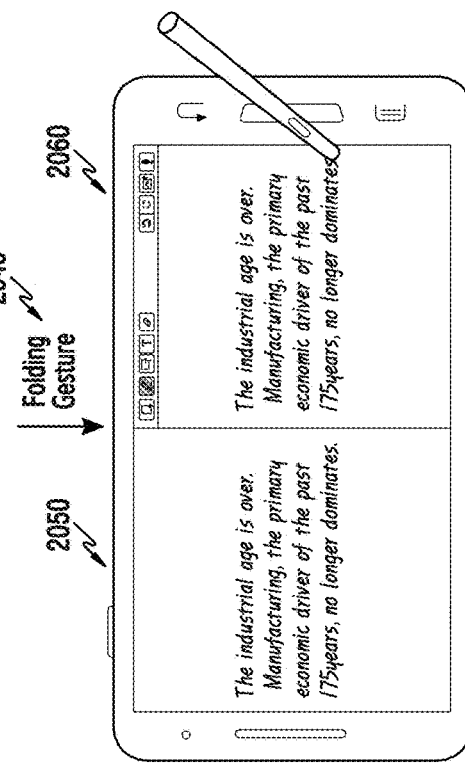
FIG.20A
FIG.20B
FIG.20C

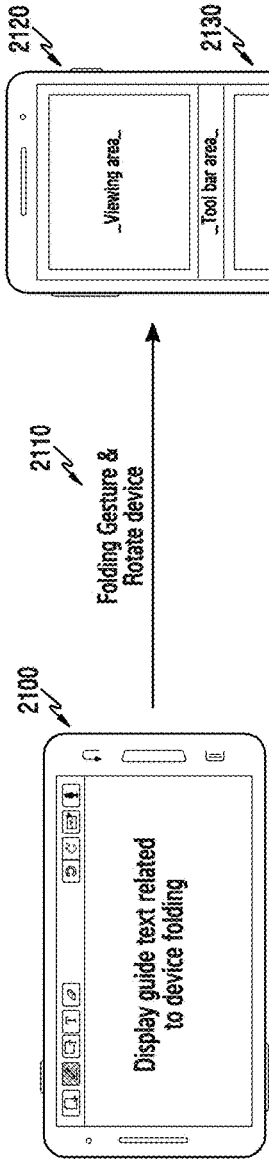
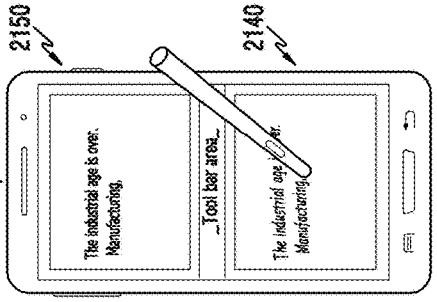
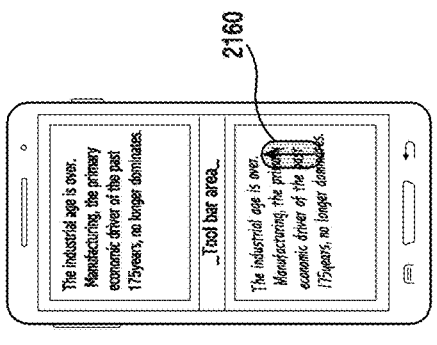
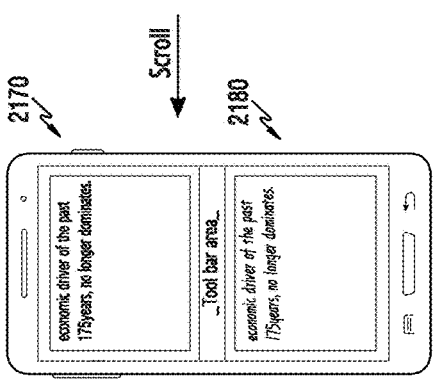

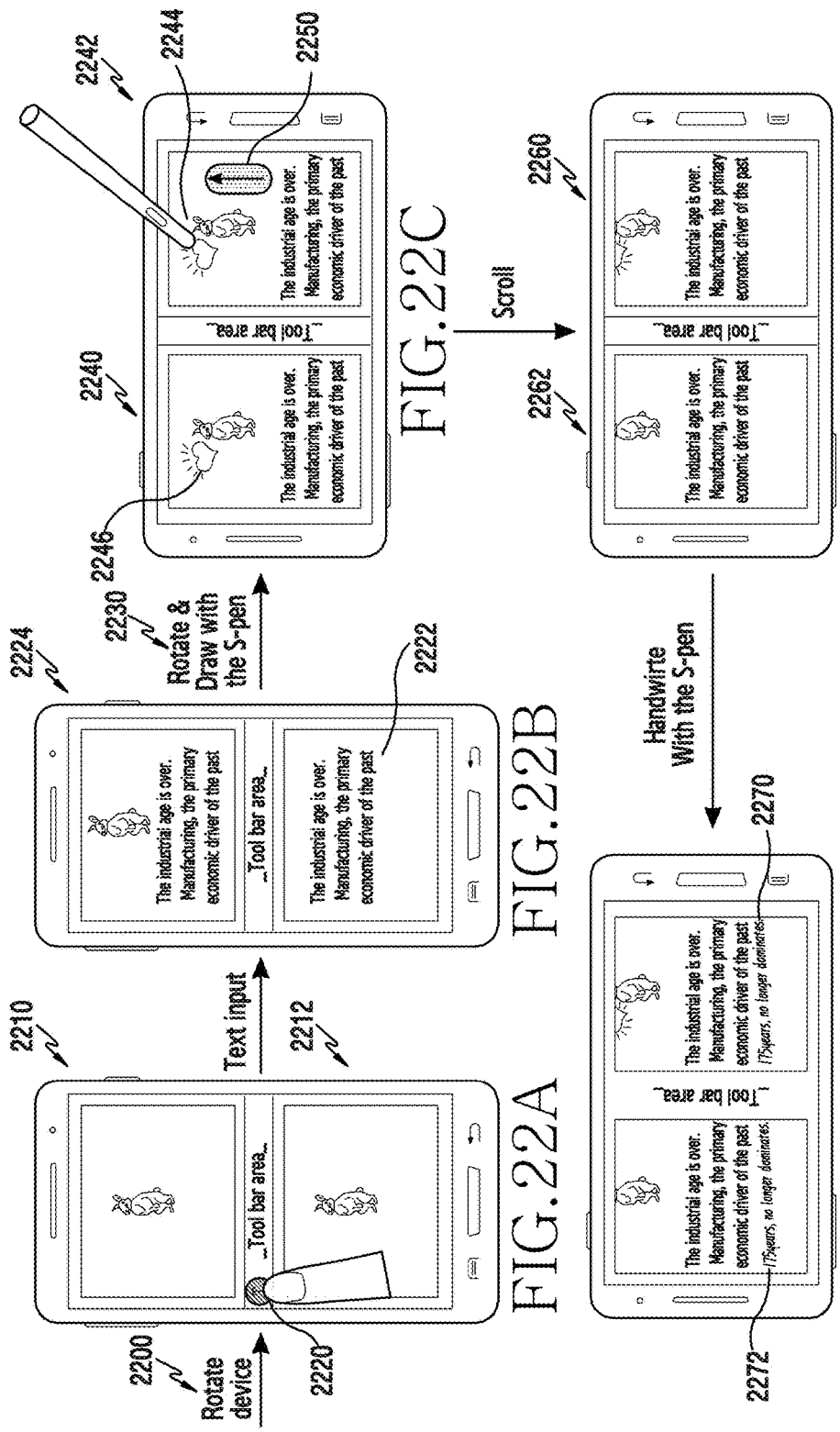

METHOD FOR CONTROLLING CONTENT AND ELECTRONIC DEVICE THEREOF

CROSS-REFERENCE TO RELATED APPLICATION(S)

This application claims the benefit under 35 U.S.C. § 119(a) of a Korean patent application filed on Dec. 28, 2015 in the Korean Intellectual Property Office and assigned Serial number 10-2015-0187810, the entire disclosure of which is hereby incorporated by reference.

TECHNICAL FIELD

The present disclosure relates to an apparatus and method for controlling content displayed on a display of an electronic device when the display has a changeable shape.

BACKGROUND

With the advance of information communication techniques and semiconductor techniques, various electronic devices are being developed into multimedia devices for providing various multimedia services. For example, a portable electronic device may provide various multimedia services such as a broadcasting service, a wireless Internet service, a camera service, and a music playback service.

The electronic device is improved in a hardware or software manner to satisfy various user demands. For example, the electronic device uses a touch screen to improve space utilization, thereby increasing a size of a display area.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device output one screen irrespective of a size of a display area. For example, upon detecting a touch input (e.g., a zoom-in, a zoom-out, a scroll, etc.) for changing a shape of content, the electronic device may display on the display area the content whose shape is changed by the touch input. Accordingly, in order to identify original content, a user of the electronic device inconveniently has to manually restore the content and search for the original content.

Another aspect of the present disclosure may provide an apparatus and method for removing displayed content in a foldable electronic device having a shape-changeable display.

In accordance with an aspect of the present disclosure, an electronic device is provided. The electronic device includes a display having a changeable shape (e.g., bendable), a sensor, and at least one processor configured to control to the display to display content, detect rotation information of the electronic device upon detecting shape change information (e.g., bending information) of the display through the sensor, determine control information based on the rotation information of the electronic device, generate additional content corresponding to the content based on the control information, and control the display to display the content and the additional content on different display areas of the display.

In accordance with another aspect of the present disclosure, a method of operating an electronic device having a shape-changeable display is provided. The method includes displaying content on the display, detecting rotation information of the electronic device upon detecting shape change information of the display, determining control information based on the rotation information of the electronic device, generating additional content corresponding to the content based on the control information, and displaying the content and the additional content on different display areas of the display.

In accordance with another aspect of the present invention disclosure, a non-transitory computer-readable recording medium having recorded thereon a program, which, when executed by at least one processor, performs a method is provided. The method includes displaying content on the display, detecting rotation information of the electronic device upon detecting shape change information of the display, determining control information based on the rotation information of the electronic device, generating additional content corresponding to the content based on the control information, and displaying the content and the additional content on different display areas of the display.

According to various embodiments, an electronic device and an operating method thereof provide a duplication mode for duplicating and displaying content based on a shape change of a display, so that a user of the electronic device can easily edit the displayed content.

According to various embodiments, an electronic device and an operating method thereof may determine a control level of a duplication mode based on rotation information of the electronic device, so that the duplication mode required to edit content can be provided in various manners.

According to various embodiments, an electronic device and an operating method thereof may provide a duplication mode including a digital signal processing function based on rotation information of the electronic device, so that the duplication mode required to edit content can be provided in various manners.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 14A, 14B, 14C, and 14D illustrate a screen configuration for controlling map content through a duplication mode in an electronic device according to various embodiments of the present disclosure;

FIGS. 15A, 15B, 15C, and 15D illustrate a screen configuration for generating an image through a duplication mode in an electronic device according to various embodiments of the present disclosure;

FIGS. 17A, 17B, 17C, 17D, and 17E illustrate a screen configuration for providing a direction guide service based on input information in an electronic device according to various embodiments of the present disclosure;

FIGS. 19A, 19B, 19C, and 19D illustrate a screen configuration for sharing input information through a duplication mode in an electronic device according to various embodiments of the present disclosure;

FIGS. 20A, 20B, and 20C illustrate a screen configuration for providing a memo function through a duplication mode in an electronic device according to various embodiments of the present disclosure;

FIGS. 21A, 21B, 21C, 21D, and 21E illustrate a screen configuration for providing a memo function in association with a control level of a duplication mode in an electronic device according to various embodiments of the present disclosure; and FIGS. 22A, 22B, 22C, 22D, and 22E illustrate a screen configuration for inputting a text in association with a control level of a duplication mode in an electronic device according to various embodiments of the present disclosure.

Throughout the drawings, like reference numerals will be understood to refer to like parts, components, and structures.

DETAILED DESCRIPTION

Figure 1A:
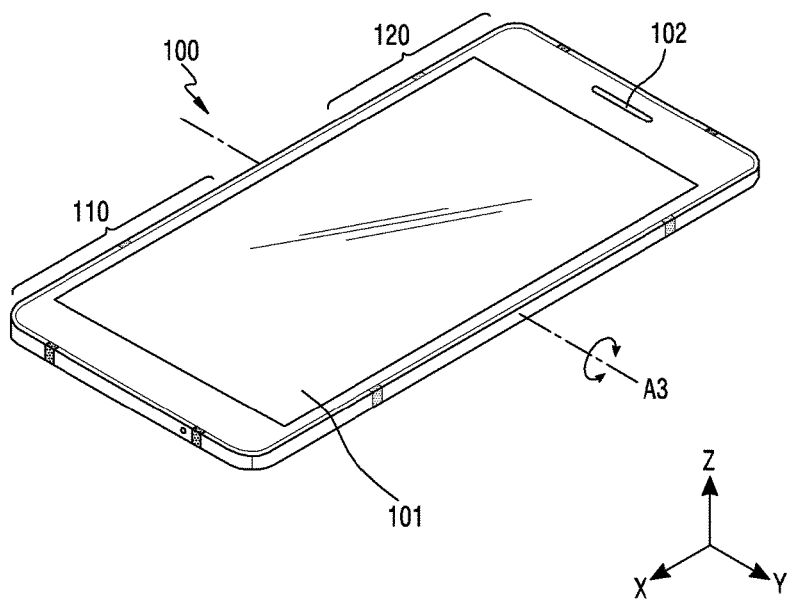
FIGS. 1A, 1B, and 1C illustrate an exterior configuration of a foldable electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, operations, elements, parts, or a combination thereof described in the specifications, and do not preclude the presence or addition of one or more other features, numbers, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a laptop PC, a netbook computer, a workstation, a personal digital assistant (PDA), a portable multimedia player (PMP), an Moving Picture Experts Group phase 1 or phase 2 (MPEG-1 or MPEG-2) audio layer 3 (MP3) player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to another embodiment, the electronic device may include at least one of various medical devices (e.g., various portable medical measuring devices (a blood glucose monitoring device, a heart rate monitoring device, a blood pressure measuring device, a body temperature measuring device, etc.)), a navigation device, a global navigation satellite system (GNSS) receiver, an event data recorder (EDR), a flight data recorder (FDR), a vehicle infotainment devices, an electronic devices for a ship (e.g., a navigation device for a ship, and a gyro-compass), avionics, security devices, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). The electronic device according to some embodiments of the present disclosure may be a flexible device. Further, the electronic device according to an embodiment of the present disclosure is not limited to the aforementioned devices, and may include a new electronic device according to the development of technology In various embodiments of the present disclosure, an electronic device may include a foldable device. For example, the electronic device may include a flexible display whose shape is changeable. For example, the electronic device may include a plurality of displays, and the plurality of displays may overlap by folding the electronic device, or may be arranged contiguously so as to be used as one display.

Figure 1B:
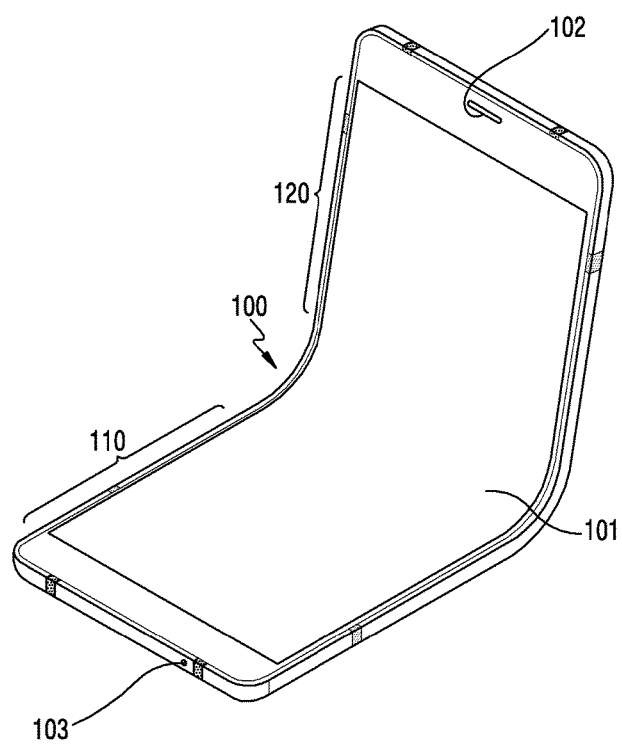
Figure 1C:
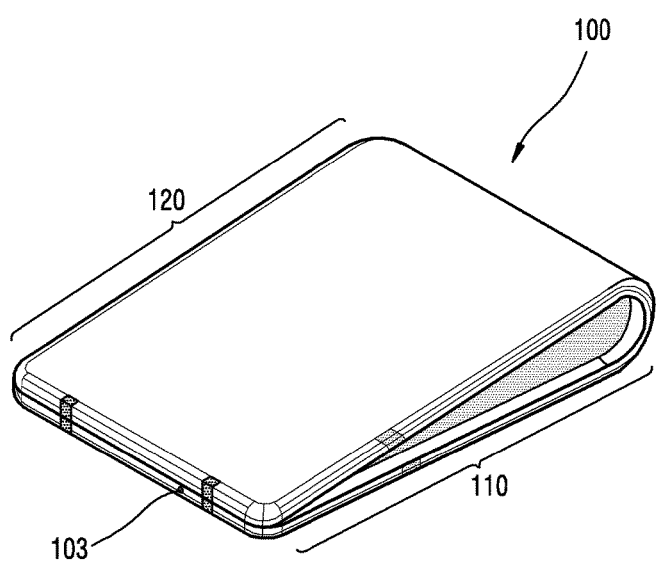

FIGS. 1A to 1C illustrate an exterior configuration of a foldable electronic device according to various embodiments of the present disclosure. The exterior configuration of the electronic device including a flexible display is illustrated in the following description.

Referring to FIGS. 1A to 1C, as shown in FIG. 1A, an electronic device 100 may be constructed of one body. For example, the electronic device 100 may be a communication electronic device including a speaker unit 102 and a microphone unit 103. The electronic device 100 may include one flexible display 101 whose shape is changeable.

According to one embodiment, as shown in FIG. 1B, the electronic device 100 may be bent about a specific rotation axis (e.g., A3). For example, if the electronic device 100 is bent about the specific rotation axis, the display 101 may be divided into a $1^{st}$ area 110 and a $2^{nd}$ area 120 about the rotation axis (e.g., A3).

According to one embodiment, as shown in FIG. 1C, the electronic device 100 may change a shape of the display 101 such that the $1^{st}$ area 110 and the $2^{nd}$ area 120 overlap.

Figure 2:
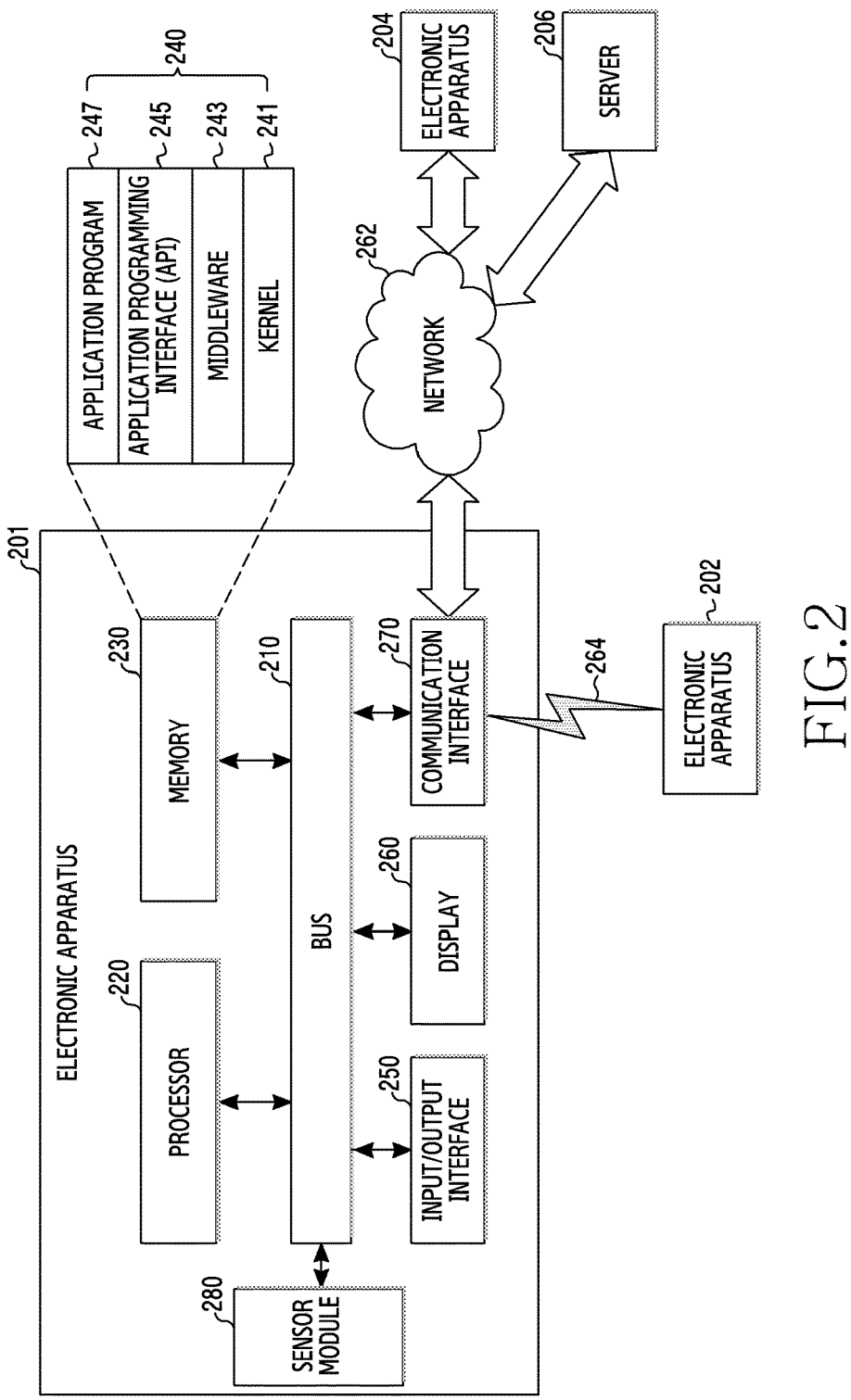
FIG. 2 illustrates an electronic device in a network environment according to an embodiment of the present disclosure.

FIG. 2 illustrates an electronic device in a network environment according to an embodiment of the present disclosure.

Referring to FIG. 2, an electronic device 201 may include a bus 210, a processor 220 (e.g., including processing circuitry), a memory 230, an input/output interface 250 (e.g., including input/output circuitry), a display 260 (e.g., including display circuitry), a communication interface 270 (e.g., including communication circuitry), and a sensor module 280 (e.g., including sensor circuitry). In a certain embodiment, the electronic device 201 may omit at least one of the aforementioned constitutional elements or may additionally include other constitutional elements.

The bus 210 may include a circuit for connecting the aforementioned constitutional elements 220 to 280 to each other and for delivering communication (e.g., a control message and/or data) between the aforementioned constitutional elements.

The processor 220 may include one or more of a CPU, an AP, and a communication processor (CP). For example, the processor 220 may execute an arithmetic operation or data processing for control and/or communication of different constitutional elements of the electronic device 201.

According to one embodiment, the processor 220 may detect a shape change of the display 260 based on sensing data provided through the sensor module 280. For example, the processor 220 may detect a shape change in which the display 260 is folded or unfolded based on motion data of the display 260. The motion data is acquired through at least one motion sensor disposed to different areas of the display 260.

According to one embodiment, the processor 220 may determine whether to execute a duplication mode based on shape change information of the display 260. For example, if the display 260 is folded and unfolded within a reference range, the processor 220 may determine that an event of executing the duplication mode is generated. For example, if the display 260 is folded and unfolded within the reference range in a state where a touch on at least one area of the display 260 is maintained, the processor 220 may determine that the event of executing the duplication mode is generated. In addition, the processor 220 may determine whether the event of executing the duplication mode is generated by additionally considering rotation information of the electronic device 201. For example, the rotation information of the electronic device 201 may include whether the electronic device 201 rotates or a direction of the electronic device 201 (or the display 260).

According to one embodiment, upon detecting the event of executing the duplication mode, the processor 220 may provide the duplication mode for controlling content displayed on the display 260. For example, upon detecting the event of executing the duplication mode, the processor 220 may control the display 260 to duplicate the content displayed on the display 260 and thus additionally display the content. More specifically, the processor 220 may divide the display 260 into a plurality of areas based on the duplication mode. For example, the processor 220 may divide the display 260 into the plurality of areas according to a rotation axis about which the electronic device 201 is folded. The processor 220 may control the display 260 such that the content displayed on the display 260 is displayed on a $1^{st}$ area, and the content is duplicated to be displayed on a $2^{nd}$ area. For example, the processor 220 may capture the content displayed on the $1^{st}$ area, or may duplicate a configuration of the content to generate additional content with another configuration. Herein, the configuration of content may include configuration information for displaying the content on the display.

According to one embodiment, when the duplication mode is provided, the processor 220 may control a display area of the content based on a feature of the content. For example, the processor 220 may determine whether a main area is set based on the feature of the content displayed through the duplication mode. If the main area is set, the processor 220 may update a size of the $1^{st}$ area of the display 260 in accordance with a reference size for displaying the content. For example, the feature of the content may include a type of an application for providing the content, a type of a service provided through the application, or the like.

According to one embodiment, when the duplication mode is provided, the processor 220 may determine a control level of the duplication mode based on the rotation information of the electronic device 201. For example, if the rotation of the electronic device 201 is detected during an action of folding and unfolding the display 260, the processor 220 may determine the control level of the duplication mode to a $1^{st}$ level. If the rotation of the electronic device 201 is not detected, the processor 220 may determine the control level of the duplication mode to a $2^{nd}$ level. For example, if a direction of the electronic device 201 (or the display 260) for providing the duplication mode is a $1^{st}$ direction, the processor 220 may determine the control level of the duplication mode to the $1^{st}$ level. If the direction of the electronic device 201 (or the display 260) is a $2^{nd}$ direction, the processor 220 may determine the control level of the duplication mode to the $2^{nd}$ level. For example, the $1^{st}$ direction may include a portrait direction in which the $1^{st}$ area and $2^{nd}$ area of the display 260 are vertically disposed, and the $2^{nd}$ direction may include a landscape direction in which the $1^{st}$ area and $2^{nd}$ area of the display 260 are horizontally disposed. For example, the $1^{st}$ level may indicate a control level at which input information provided through any one area in the duplication mode is shared with another area by performing digital signal processing. The $2^{nd}$ level may indicate a control level at which input information provided through any one area in the duplication mode is shared with another area without conversion.

According to one embodiment, when the duplication mode is provided, the processor 220 may independently control each display area. For example, upon detecting a touch input on the $1^{st}$ area, the processor 220 may update (e.g., zoom in, zoom out, move, or the like) the content displayed on the $1^{st}$ area in association with the touch input. In this case, the processor 220 may maintain the displaying of the content on the $2^{nd}$ area.

According to one embodiment, the processor 220 may provide control to share information of display areas generated by the duplication mode. For example, if a region of a map image displayed on the 2nd area is moved, the processor 220 may move a map image displayed on the $1^{st}$ area in association with a center region of the map image displayed on the $2^{nd}$ area. For example, if an object is added to an image displayed on the $2^{nd}$ area, the same object may be added to an image displayed on the $1^{st}$ area. In addition, when display information is shared, the processor 220 may provide control such that the display information to be shared is displayed on another display area by performing digital signal processing. For example, the digital signal processing may include a processing scheme for converting input information acquired through any one display area into a control command corresponding to another display area or for converting input information which is input by a touch pen into a digital form.

The memory 230 may include a volatile and/or non-volatile memory. For example, the memory 230 may store an instruction or data (e.g., a reference distance) related to at least one different constitutional element of the electronic device 201. According to one embodiment, the memory 230 may store a software and/or a program 240. For example, the program 240 may include a kernel 241, a middleware 243, an application programming interface (API) 245, and/or an application program (or an "application") 247, or the like. At least one part of the kernel 241, middleware 243, or API 245 may be referred to as an operating system (OS).

The input/output interface 250 may play a role of an interface for delivering an instruction or data input from a user or a different external device(s) to the different constitutional elements of the electronic device 201. Further, the input/output interface 250 may output an instruction or data received from the different constitutional element(s) of the electronic device 201 to the different external device. According to one embodiment, the input/output interface 250 may include a touch panel for detecting a touch input or a hovering input by using an electronic pen or a part of a user's body. According to one embodiment, the input/output interface 250 may receive a gesture or a proximity input by using the electronic pen or the part of the user's body.

The display 260 may display a variety of contents (e.g., text, image, video, icon, symbol, etc.) for the user. According to one embodiment, the display 260 may include a flexible display whose shape is changeable. According to one embodiment, the display 260 may be constructed of a set of a plurality of displays.

The communication interface 270 may establish a communication between the electronic device 201 and the external device. For example, the communication interface 270 may communicate with the external device (e.g., a $2^{nd}$ external electronic device 204 or a server 206) by being connected with a network 262 through a wireless communication or a wired communication. For example, the communication interface 270 may communicate with an external device (e.g., a $1^{st}$ external electronic device 202) through a near-distance communication 264 or a wired communication.

According to one embodiment, the network 262 may include at least one of a telecommunications network, a computer network (e.g., local area network (LAN) or wireless area network (WAN)), the Internet, and a telephone network.

The sensor module 280 may generate sensor data by converting measurement information regarding physical quantity or detection information regarding an operational state of the electronic device into an electric signal. For example, the sensor module 280 may include a plurality of sensors disposed to different areas of the display 260 to detect a shape change of the display 260. For example, the sensor module 280 may generate sensor data corresponding to a motion of the electronic device 201. For example, the sensor module 280 may include a gravity sensor, an acceleration sensor, a gyro sensor, and a geomagnetic sensor.

According to one embodiment, the display 260 may be implemented as a touch screen by being coupled with a touch panel of the input/output interface 250.

Figure 3:
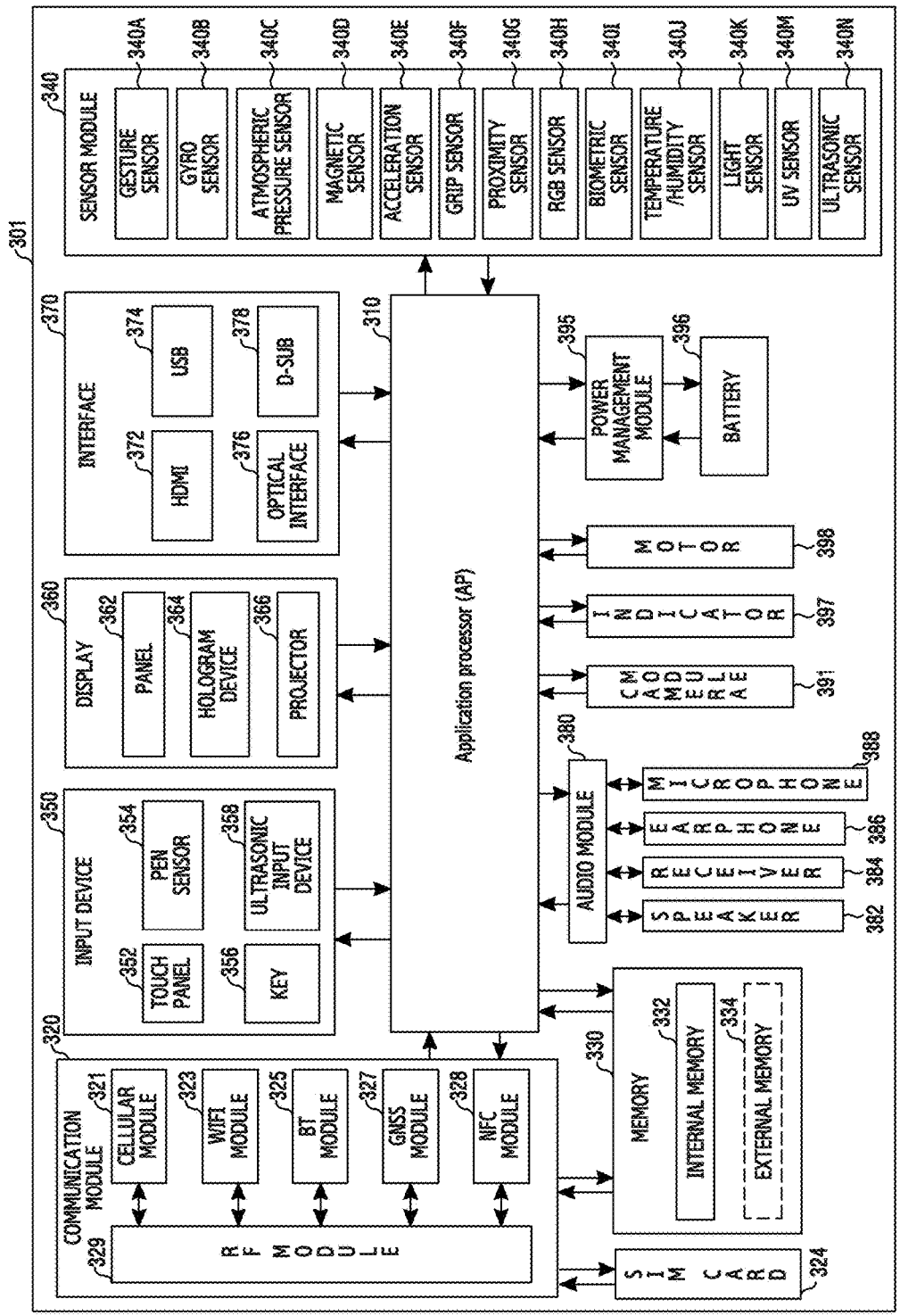
FIG. 3 illustrates a block diagram of an electronic device according to an embodiment of the present disclosure.

FIG. 3 illustrates a block diagram of an electronic device 301 according to an embodiment of the present disclosure. In the following description, the electronic device 301 may include all or some parts of the electronic device 201 of FIG. 2.

Referring to FIG. 3, the electronic device 301 may include one or more processors (e.g., APs) 310, a communication module 320, a subscriber identity module 324, a memory 330, a sensor module 340, an input unit 350, a display 360, an interface 370, an audio module 380, a camera module 391, a power management module 395, a battery 396, an indicator 397, and a motor 398.

The processor 310 may control a plurality of hardware or software constitutional elements connected to the processor 310 by driving an operating system (OS) or an application program, and may execute a variety of data processing and arithmetic operations. For example, the processor 310 may be implemented with a system on chip (SoC). According to one embodiment, the processor 310 may further include a graphic processing unit (GPU) and/or an image signal processor (ISP). The processor 310 may include at least one part (e.g., a cellular module 321) of the constitutional elements of FIG. 3. The processor 310 may load an instruction or data, received from at least one of different constitutional elements (e.g., a non-volatile memory), into a volatile memory to process the instruction or data, and may store a variety of data into the non-volatile memory.

According to one embodiment, in order to control content displayed on the display 360, the processor 310 may control a duplication mode for duplicating and additionally displaying the content.

The communication module 320 may have the same or similar structure as the communication interface 270 of FIG. 2. For example, the communication module 320 may include the cellular module 321, a Wi-Fi module 323, a BlueTooth (BT) module 325, a GNSS module (e.g., a global positioning system (GPS) module, a Glonass module, a Beidou module, or a Galileo nodule) 327, a near field communication (NFC) module 328, and a radio frequency (RF) module 329.

For example, the cellular module 321 may provide a voice call, a video call, a text service, an Internet service, or the like through a communication network. According to one embodiment, the cellular module 321 may identify and authenticate the electronic device 301 in the communication network by using the subscriber identity module (e.g., a subscriber identification module (SIM) card) 324. According to one embodiment, the cellular module 321 may perform at least some functions that can be provided by the processor 310. According to one embodiment, the cellular module 321 may include a CP.

According to one embodiment, each of the Wi-Fi module 323, the BT module 325, the GNSS module 327, and the NFC module 328 may include a processor for processing data transmitted/received through a corresponding module. According to a certain embodiment, at least some (e.g., two or more) of the cellular module 321, the Wi-Fi module 323, the BT module 325, the GNSS module 327, and the NFC module 328 may be included in one integrated chip (IC) or IC package.

According to one embodiment, the RF module 329 may transmit/receive a communication signal (e.g., a RF signal). According to another embodiment, at least one of the cellular module 321, the Wi-Fi module 323, the BT module 325, the GNSS module 327, and the NFC module 328 may transmit/receive an RF signal via a separate RF module.

The subscriber identity module 324 may include a card including the subscriber identity module and/or an embedded SIM, and may include unique identification information (e.g., an integrated circuit card IDentifier (ICCID)) or subscriber information (e.g., an international mobile subscriber identity (IMSI)).

For example, the memory 330 (e.g., the memory 230) may include an internal memory 332 or an external memory 334. The external memory 334 may be operatively and/or physically coupled to the electronic device 301 via various interfaces.

For example, the sensor module 340 may measure physical quantity or detect an operational status of the electronic device 301, and may convert the measured or detected information into an electric signal. For example, the sensor module 340 may include at least one of a gesture sensor 340A, a gyro sensor 340B, a pressure sensor 340C, a magnetic sensor 340D, an acceleration sensor 340E, a grip sensor 340F, a proximity sensor 340G, a color sensor 340H (e.g., a red, green, blue (RGB) sensor), a bio sensor 340I, a temperature/humidity sensor 340J, an illumination sensor 340K, an ultra violet (UV) sensor 340M, and an ultrasonic sensor 340N. Additionally or alternatively, for example, the sensor module 340 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit for controlling at least one or more sensors included therein. In a certain embodiment, the electronic device 301 may further include a processor configured to control the sensor module 304 either separately or as a part of the processor 310, and may control the sensor module 340 while the processor 310 is in a sleep state.

The input device 350 may include a touch panel 352, a (digital) pen sensor 354, a key 356, or an ultrasonic input unit 358. For example, the touch panel 352 may recognize a touch input by using at least one of an electrostatic type, an infrared type, and an ultrasonic type. The touch panel 352 may further include a control circuit. The touch penal 352 may further include a tactile layer and thus may provide the user with a tactile reaction. For example, the (digital) pen sensor 354 may be implemented by using the same or similar method of receiving a touch input of the user or by using an additional sheet for recognition. For example, the key 356 may be a physical button, an optical key, or a keypad. The ultrasonic input unit 358 may detect an ultrasonic wave generated in an input means through a microphone (e.g., a microphone 388), and may identify data corresponding to the detected ultrasonic wave.

The display 360 (e.g., the display 260) may include a panel 362, a hologram unit 364, or a projector 366. The panel 362 may include the same or similar structure of the display 260 of FIG. 2. For example, the panel 362 may be implemented in a flexible, transparent, or wearable manner. The panel 362 may be constructed as one module with the touch panel 352. The hologram unit 364 may use an interference of light and show a stereoscopic image in the air. The projector 366 may display an image by projecting a light beam onto a screen. For example, the screen may be located inside or outside the electronic device 301. According to one embodiment, the display 360 may further include a control circuit for controlling the panel 362, the hologram unit 364, or the projector 366.

The interface 370 may include a high-definition multimedia interface (HDMI) 372, a universal serial bus (USB) 374, an optical communication interface 376, or a d-subminiature (D-sub) 378. For example, the interface 370 may be included in the communication interface 270 of FIG. 2. Additionally or alternatively, the interface 370 may include a mobile high-definition link (MHL) interface, a secure digital (SD)/multi-media card (MMC) interface, or an infrared data association (IrDA) standard interface.

The audio module 380 may bilaterally convert a sound and electric signal. For example, at least one constitutional element of the audio module 380 may be included in the input/output interface 250 of FIG. 2. For example, the audio module 380 may convert sound information which is input or output through a speaker 382, a receiver 384, an earphone 386, the microphone 388, or the like.

The camera module 391 may capture a still picture and a moving picture. According to one embodiment, the camera module 391 may include one or more image sensors (e.g., a front sensor or a rear sensor), a lens, an ISP, or a flash (e.g., light-emitting diode (LED) or xenon lamp or the like).

The power management module 395 may manage power of the electronic device 301. According to one embodiment, the power management module 395 may include a power management integrated circuit (PMIC), a charger IC, or a battery or fuel gauge.

The battery 396 may include a rechargeable battery and/or a solar battery. According to one embodiment, the battery 396 may include a plurality of cells connectable in serial or parallel.

The indicator 397 may indicate a specific state (e.g., a booting state, a message state, a charging state, etc.) of the electronic device 301 or a part thereof (e.g., the processor 310).

The motor 398 may convert an electric signal into a mechanical vibration, and may generate a vibration or haptic effect or the like.

Each of constitutional elements described in the present document may consist of one or more components, and names of the constitutional elements may vary depending on a type of an electronic device. In various embodiments, the electronic device may include at least one of the constitutional elements described in the present document. Some of the constitutional elements may be omitted, or additional other constitutional elements may be further included. In addition, some of the constitutional elements of the electronic device according to the various embodiments may be combined and constructed to one entity, so as to equally perform functions of corresponding constitutional elements before combination.

Figure 4:
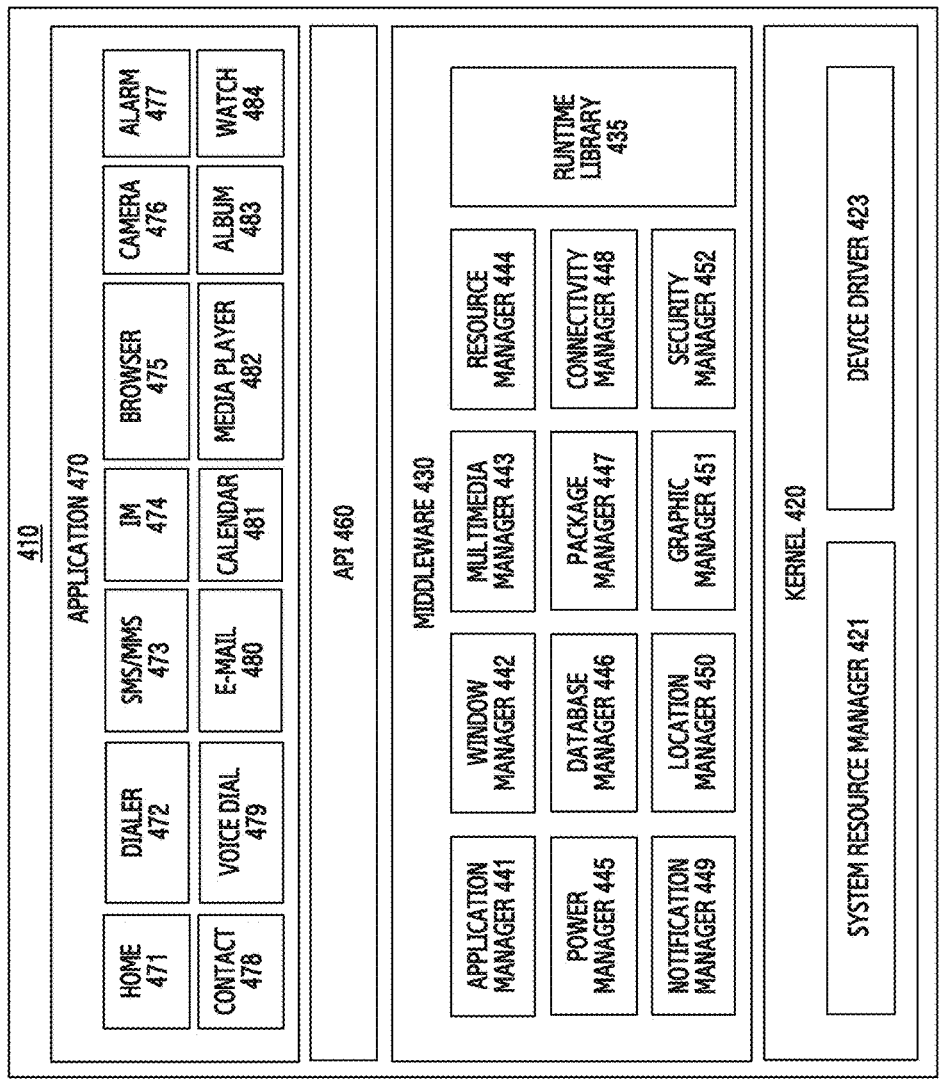
FIG. 4 illustrates a block diagram of a program module according to an embodiment of the present disclosure.

FIG. 4 illustrates a block diagram of a program module according to an embodiment. According to one embodiment, a program module 410 (e.g., the program 240) may include an OS for controlling a resource related to an electronic device (e.g., the electronic device 201 or 301) and/or various applications (e.g., the application 247) driven on the OS. For example, the OS may be Android®, iOS®, Windows®, Symbian®, Tizen®, Bada®, or the like.

Referring to FIG. 4, the program module 410 may include a kernel 420, a middleware 430, an API 460, and/or an application 470. At least one part of the program module 410 can be preloaded on the electronic device, or can be downloaded from an external device.

For example, the kernel 420 (e.g., the kernel 241) may include a system resource manager 421 and/or a device driver 423. The system resource manager 421 may perform control, allocation, retrieval, or the like of the system resource.

For example, the middleware 430 may provide a function commonly required by the application 470, or may provide various functions through the API 460 so that the application 470 can effectively use a limited system resource in the electronic device. According to one embodiment, the middleware 430 (e.g., the middleware 243) may include at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, a security manager 452, and an event manager 453.

The runtime library 435 may include a library module used by a compiler to add a new function through a programming language while the application 470 is executed. The runtime library 435 may perform an operation of an input/output management, a memory management, an arithmetic function, or the like.

The application manager 441 may manage a life cycle of at least one application. The window manager 442 may manage a graphic user interface (GUI) resource used in a screen. The multimedia manager 443 may recognize a format required to reproduce various media files, and may use a codec suitable for the format to perform encoding or decoding of the media file. The resource manager 444 may manage a resource (e.g., a source code, a memory, a storage space, etc.) of at least one application among the applications 470.

The power manager 445 may manage a battery or power by operating together with a basic input/output system (BIOS), or the like, and may provide power information or the like required for the operation. The database manager 446 may manage to generate, search, or change a database to be used in at least one application among the applications 470. The package manager 447 may manage an installation or update of an application distributed in a form of a package file.

The connectivity manager 448 may manage a wireless connection using a near-distance communication (e.g., Wi-Fi, BT, etc.) or a cellular communication. The notification manager 449 may display or notify an event such as an incoming message, an appointment, a proximity notification, or the like, in a manner of not disturbing the user. The location manager 450 may manage location information of the electronic device.

The graphic manager 451 may manage a graphic effect to be provided to the user or a user interface related thereto. According to one embodiment, if the duplication mode is provided, the graphic manager 451 may provide control such that content displayed on the display is duplicated to be additionally displayed on a display area different from that of original content.

The security manager 452 may provide a general security function required for system security, user authentication, or the like. The event manager 453 may process an event generated in each display area included in the display. For example, if the display is divided into a $1^{st}$ area and a $2^{nd}$ area to provide the duplication mode, the event manager 453 may include a $1^{st}$ event manager for processing an event generated in the $1^{st}$ area and a $2^{nd}$ event manager for processing an event generated in the $2^{nd}$ area.

According to one embodiment, if the electronic device (e.g., the electronic device 201) includes a telephone function, the middleware 430 may further include a telephony manager for managing a voice or video telephony function of the electronic device.

The middleware 430 may include a middleware module for forming a combination of various functions of the aforementioned constitutional elements. The middleware 430 may provide a module specified for each type of OS to provide a differentiated function. Further, the middleware 430 may dynamically delete some of the existing constitutional elements or may add new constitutional elements.

For example, the API 460 (e.g., the API 245) is a set of API programming functions, and may be provided with other configurations according to an OS. For example, in case of Android or iOS, one API set may be provided for each platform, and in case of Tizen, two or more API sets may be provided.

The application 470 (e.g., the application program 247) may include one or more applications capable of providing a function of a home 471, a dialer 472, a short message service (SMS)/multimedia messaging service (MMS) 473, an instant message (IM) 474, a browser 475, a camera 476, an alarm 477, a contact 478, a voice dial 479, an e-mail 480, a calendar 481, a media player 482, an album 483, a clock 484, a health care (e.g., an application for measuring a physical activity level, a blood sugar level, etc.), or providing of environment information (e.g., providing of atmospheric pressure, humidity, or temperature information).

Figure 5:
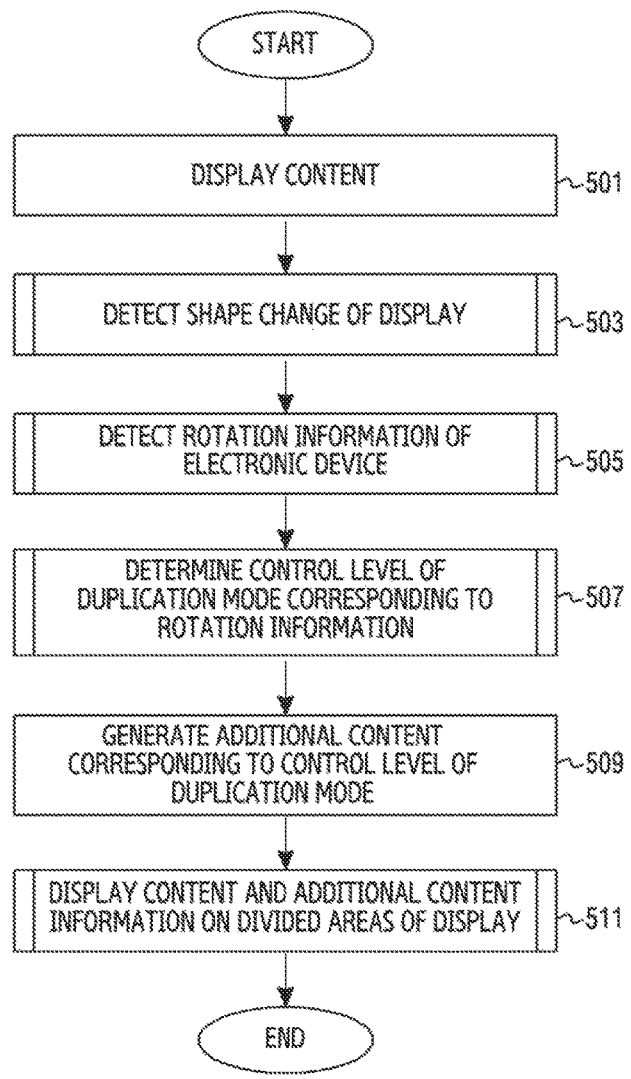
FIG. 5 illustrates a flowchart for providing a duplication mode corresponding to rotation information in an electronic device according to an embodiment of the present disclosure.

FIG. 5 illustrates a flowchart for providing a duplication mode corresponding to rotation information in an electronic device according to an embodiment of the present disclosure.

Referring to FIG. 5, in operation 501, the electronic device (e.g., the electronic device 201 or 301) may display content on a display operatively coupled to the electronic device. For example, upon detecting an input for executing an application through the input/output interface 250, the processor 220 may execute the application. In this case, the processor 220 may control the display 260 to display content (e.g., an execution screen) for executing the application.

In operation 503, the electronic device may detect shape change information of the display. For example, the processor 220 may detect the shape change information to know whether the display 260 is folded and unfolded based on motion information of the display 260. The motion information is measured by using a plurality of motion sensors disposed to different areas of the display 260. For example, the processor 220 may detect the shape change information indicating that the display 260 is folded and unfolded based on sensing data of magnetic sensors (e.g., hall sensors) disposed to different areas of the display 260. For example, the processor 220 may detect the shape change information indicating that the display 260 is folded and unfolded by using bending sensors disposed to at least one area of the display 260. In addition, the processor 220 may determine whether the shape change information regarding the display 260 is detected in a state where a touch on the display 260 is maintained.

In operation 505, the electronic device may detect rotation information of the electronic device in response to the shape change of the display. For example, the processor 220 may detect the rotation information of the electronic device 201 during the shape of the display is changed. For example, the processor 220 may detect a direction of the electronic device 201 (or the display 260) at a time of detecting the shape change information of the display.

In operation 507, the electronic device may determine a control level of a duplication mode corresponding to the rotation information of the electronic device. For example, if the rotation of the electronic device 201 is detected during the shape of the display is changed, the processor 220 may set the control level of the duplication mode to a $1^{st}$ level. If the rotation of the electronic device 201 is not detected during the shape of the display is changed, the processor 220 may set the control level of the duplication mode to a $2^{nd}$ level. For example, if the electronic device 201 is in a $1^{st}$ direction (e.g., a portrait direction) at a time of detecting the shape change information of the display, the processor 220 may set the control level of the duplication mode to the $1^{st}$ level. If the electronic device 201 is in a $2^{nd}$ direction (e.g., a landscape direction) at a time of detecting the shape change information of the display, the processor 220 may set the control level of the duplication mode to the $2^{nd}$ level. For example, the $1^{st}$ level may indicate a control level at which input information provided through any one display area of the display 260 divided for the duplication mode is shared with another area by performing digital signal processing. The $2^{nd}$ level may indicate a control level at which input information provided through any one display area of the display 260 divided for the duplication mode is shared with another area without conversion.

In operation 509, the electronic device may generate additional content corresponding to the control level of the duplication mode. For example, the processor 220 may newly generate the additional content by duplicating a configuration the content displayed on the display 260. For example, if the control level of the duplication mode is set to the $2^{nd}$ level, the processor 220 may add a configuration for a digital signal processing to the newly generated additional content. For example, if the control level of the duplication mode is set to the $2^{nd}$ level, the processor 220 may capture the content displayed on the display 260.

In operation 511, the electronic device may display the content and the additional content on different divided areas included in the display. For example, upon detecting the shape change in which the display 260 is folded and unfolded in a state where a touch on at least one area of the display 260 is maintained, the processor 220 may be divided into the $1^{st}$ area and the $2^{nd}$ area. The processor 220 may control the display 260 to display content displayed before the shape change of the display 260 is detected on the $1^{st}$ area and to display additional content on the $2^{nd}$ area. For example, the processor 220 may divide the display 260 into the $1^{st}$ and $2^{nd}$ areas each having the same size. For example, the processor 220 may divide the display 260 into the $1^{st}$ area and the $2^{nd}$ area about a rotation axis by which the shape change of the display 260 occurs. In addition, if any one of the divided areas of the display 260 is set to a main area, the processor 220 may update a size of the main area in association with a size of content.

According to various embodiments of the present disclosure, if the duplication of the content is restricted, the electronic device may restrict the duplication mode of the content. For example, upon detecting shape change information indicating that the display 260 is folded and unfolded, the electronic device 201 (e.g., the processor 220) may determine whether the content displayed on the display 260 is duplicable. If the content is duplicable, the electronic device 201 may display additional content for the duplication mode of the content as shown in the operations 505 to 511 of FIG. 5. If the duplication of the content is restricted, the electronic device 201 may maintain the displaying of the content on the display 260.

FIGS. 6 and 7A to 7C illustrates a flowchart for detecting shape change information of a display in an electronic device according to an embodiment of the present disclosure.

Figure 7:
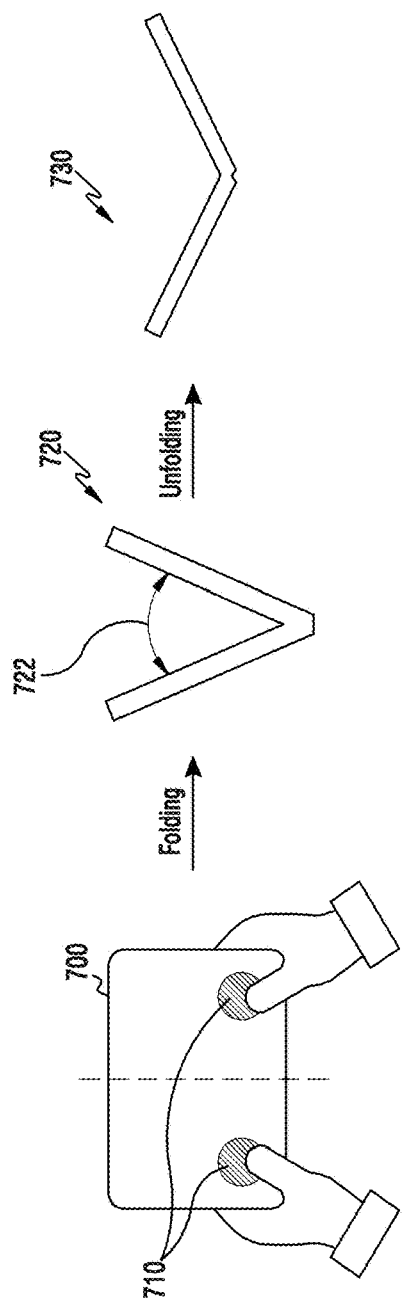
FIGS. 7A, 7B, and 7C illustrate a configuration of changing a shape of a display for a duplication mode in an electronic device according to various embodiments of the present disclosure.

FIGS. 7A to 7C illustrate a configuration of changing a shape of a display for a duplication mode in an electronic device according to various embodiments of the present disclosure. An operation of detecting shape change information of the display for the duplication mode as shown in the operation 503 of FIG. 5 is described below with reference to FIGS. 7A to 7C.

Figure 6:
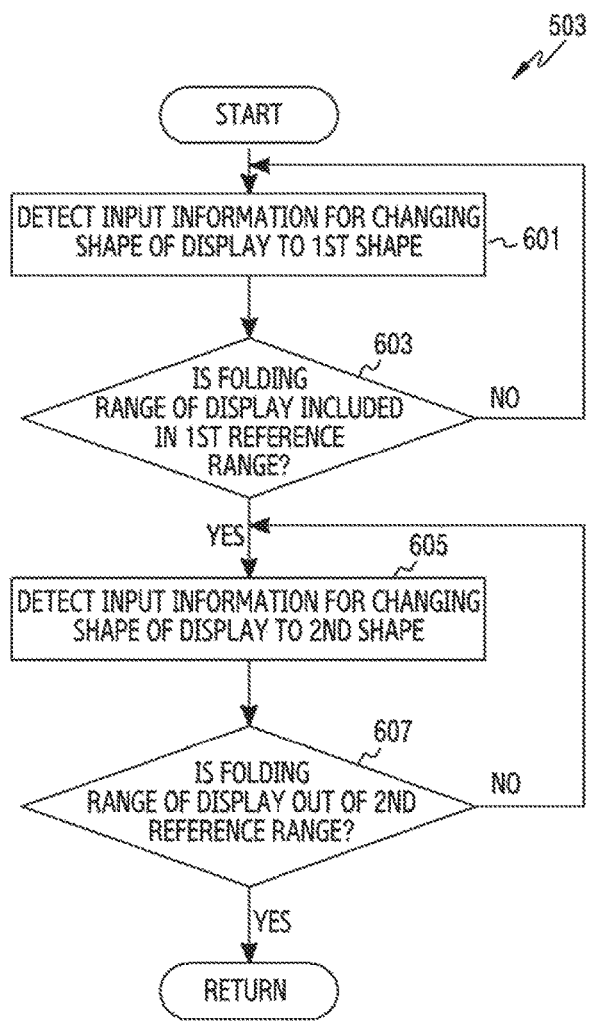
FIG. 6 illustrates a flowchart for detecting shape change information of a display in an electronic device according to an embodiment of the present disclosure.

Referring to FIG. 6, in operation 601, the electronic device (e.g., the electronic device 201 or 301) may detect input information (gesture) for changing a shape of the display to a $1^{st}$ shape in a state of displaying content on a display (e.g., the operation 501 of FIG. 5). For example, as shown in FIG. 7A by using sensor data acquired through the sensor module 280, the processor 220 may determine whether a $1^{st}$ gesture is detected to fold a display 700 in a state 710 of maintaining a touch on the display 260 on which content is displayed (see 700). For example, upon detecting the $1^{st}$ gesture in the state 710 of maintaining the touch, the processor 220 may control the display 260 to display at least one of touch state information and folding information.

In operation 603, the electronic device may determine whether a folding range of the display is included in a $1^{st}$ reference range by using input information for changing the shape of the display to the $1^{st}$ shape. For example, as shown in FIG. 7B, the processor 220 may determine whether a folding angle 722 of the display 260 based on the $1^{st}$ gesture is included in the $1^{st}$ reference range (see 720). For example, the folding range of the display may include an angle of the display folded by the Pt gesture.

If the folding range of the display is not included in the $1^{st}$ reference range, returning to operation 601, the electronic device may determine whether the input information for changing the shape of the display to the $1^{st}$ shape is additionally detected. For example, if an additional gesture is not detected until a reference time elapses, the electronic device may determine not to use the duplication mode.

In operation 605, if the folding range of the display is included in the $1^{st}$ reference range, the electronic device may detect input information (gesture) for changing the shape of the display to a $2^{nd}$ shape. For example, as shown in FIG. 7B, when the display is folded to be included in the $1^{st}$ reference range by the $1^{st}$ gesture, the processor 220 may determine whether the $2^{nd}$ gesture is detected to change the shape of the display 260 to the $2^{nd}$ shape corresponding to the $1^{st}$ shape. For example, the processor 220 may determine whether the $2^{nd}$ gesture is detected in a state where the touch on the display 260 is maintained. For example, the processor 220 may determine whether the $2^{nd}$ gesture is detected before a reference time elapses from a time point at which the folding range is included in the reference range.

In operation 607, the electronic device may determine whether the folding range of the display is out of the $2^{nd}$ reference range by the input information for changing the shape of the display to the $2^{nd}$ shape. For example, as shown in FIG. 7C, the processor 220 may determine whether the $2^{nd}$ gesture is made to unfold the display 260 such that a folding angle thereof is out of the $2^{nd}$ reference range by the $2^{nd}$ gesture (see 730). For example, the $2^{nd}$ reference range may be set to be equal to or greater than the $1^{st}$ reference range.

If the folding range of the display is not out of the $2^{nd}$ reference range, returning to operation 605, the electronic device may determine whether additional input information is detected to change the shape of the display to the $2^{nd}$ shape. For example, if an additional gesture is not detected until a reference time elapses or if a touch is released, the electronic device may determine that the duplication mode is not used.

If the folding range of the display is out of the $2^{nd}$ reference range by an input for changing the shape of the display to the $2^{nd}$ change, the electronic device may determine that shape change information of the display is detected to execute the duplication mode.

Figure 8:
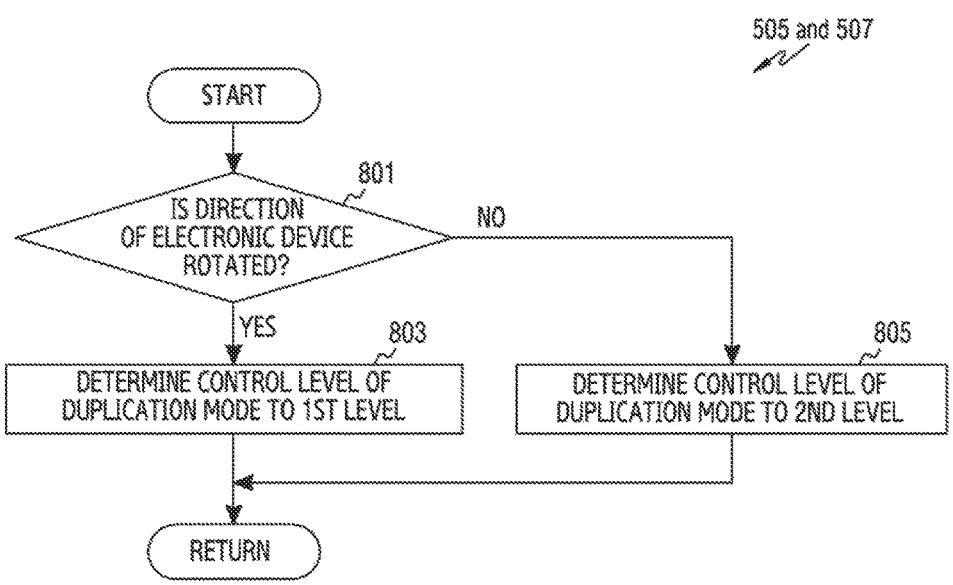
FIG. 8 illustrates a flowchart for determining a control level of a duplication mode based on whether a direction of a display rotates in an electronic device according to an embodiment of the present disclosure.

FIG. 8 illustrates a flowchart for determining a control level of a duplication mode based on whether a direction of a display rotates in an electronic device according to an embodiment of the present disclosure. An operation of determining the control level of the duplication mode as shown in the operations 505 and 507 of FIG. 5 is described below.

Referring to FIG. 8, in operation 801, the electronic device (e.g., the electronic device 201 or 301) may determine whether a rotation of the electronic device is detected during a shape change of a display is detected (e.g., the operation 503 of FIG. 5). For example, the processor 220 may determine whether the rotation of the electronic device 201 is detected based on sensing data detected through the sensor module 280 while detecting an action of folding and unfolding the display 260.

In operation 803, if the rotation of the electronic device is additionally detected while detecting the shape change of the display, the electronic device may determine a control level of a duplication mode to a $1^{st}$ level. For example, if the electronic device 201 rotates from a landscape direction to a portrait direction during an action of folding and unfolding the display 260, the processor 220 may determine the control level of the duplication mode to the $1^{st}$ level. For example, the $1^{st}$ level may include a control level for performing a digital signal processing to apply any one area of the display divided through the duplication mode to another area.

In operation 805, if the rotation of the electronic device is not detected while detecting the shape change of the display, the electronic device may determine the control level of the duplication mode to a $2^{nd}$ level. For example, if the direction of the electronic device 201 is maintained during the action of folding and unfolding the display 260, the processor 220 may determine the control level of the duplication mode to the $2^{nd}$ level. For example, the $2^{nd}$ level may include a control level which applies an input detected through any one area of the display divided to another area without a correction or a shape change.

Figure 9:
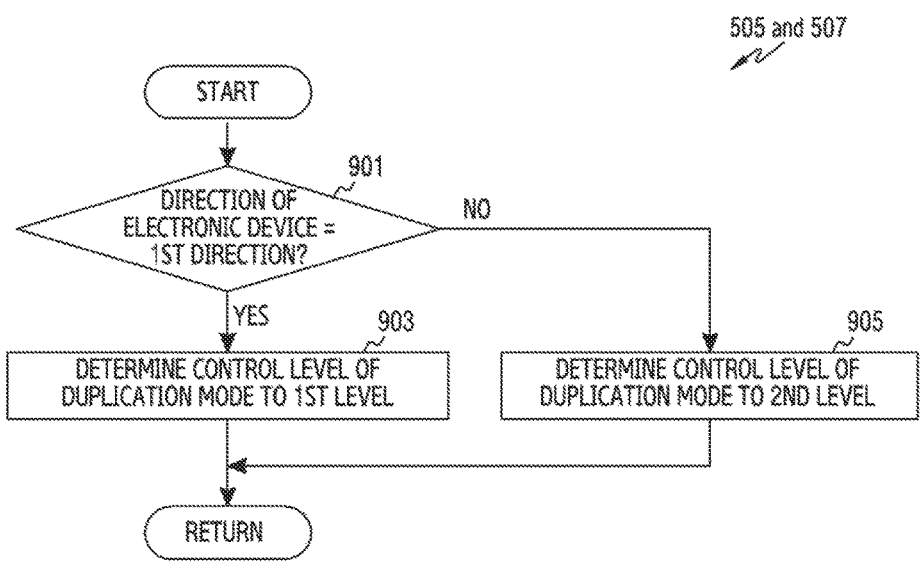
FIG. 9 illustrates a flowchart for determining a control level of a duplication mode based on a direction of a display in an electronic device according to an embodiment of the present disclosure.

FIG. 9 illustrates a flowchart for determining a control level of a duplication mode based on a direction of a display in an electronic device according to an embodiment of the present disclosure. An operation of determining the control level of the duplication mode as shown in the operations 505 and 507 of FIG. 5 is described below.

Referring to FIG. 9, in operation 901, the electronic device (e.g., the electronic device 201 or 301) may determine whether a direction of the electronic device is a 1$^{st}$ direction at a time of detecting a shape change of a display (e.g., the operation 503 of FIG. 5). For example, the processor 220 may determine whether the display 260 of the electronic device 201 is in a portrait direction at a time of detecting shape change information indicating that the display 260 is folded and unfolded.

In operation 903, if the electronic device is in the 1$^{st}$ direction (e.g., the portrait direction) at a time of detecting the shape change information of the display, the electronic device may determine the control level of the duplication mode to a 1$^{st}$ level. For example, if the display 260 is in the portrait direction at a time of detecting the shape change information indicating that the display 260 is folded and unfolded, the processor 220 may determine that this is for editing content through the duplication mode. Accordingly, the processor 220 may determine the control level of the duplication mode to the 1$^{st}$ level.

In operation 905, if the electronic device is in a 2$^{nd}$ direction (e.g., a landscape direction) at the time of detecting the shape change information of the display, the electronic device may determine that the control level of the duplication mode to a 2$^{nd}$ level. For example, if the display 260 is in a landscape direction at the time of detecting the shape change information indicating that the display 260 is folded and unfolded, the processor 220 may determine that this is for changing (e.g., zooming in, zooming out, or the like) a display shape of the content through the duplication mode. Accordingly, the processor 220 may determine the control level of the duplication mode to the 2$^{nd}$ level.

Figure 10:
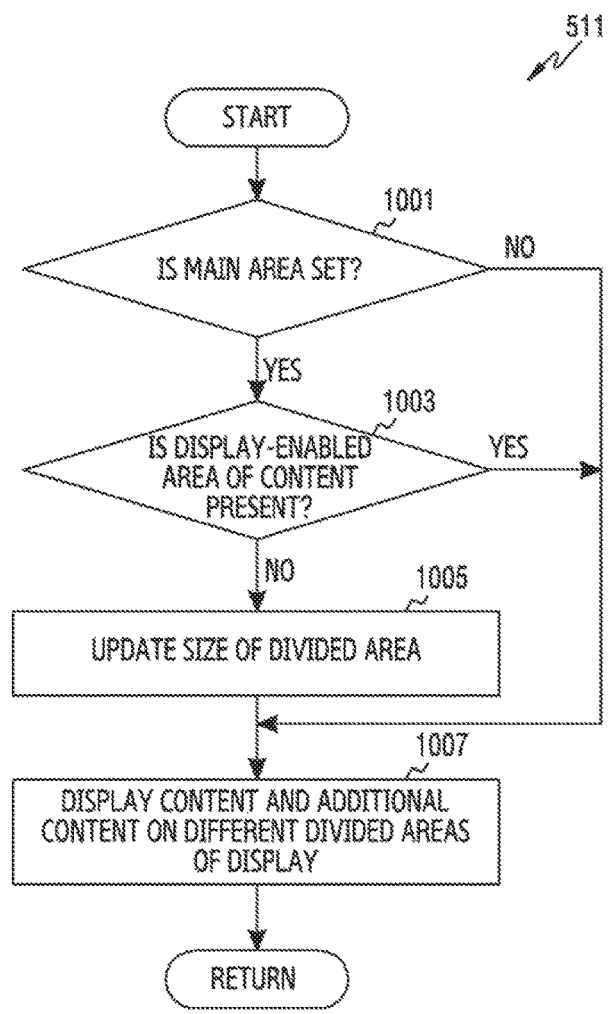
FIG. 10 illustrates a flowchart for setting an area for displaying content in an electronic device according to an embodiment of the present disclosure.

FIG. 10 illustrates a flowchart for setting an area for displaying content in an electronic device according to an embodiment of the present disclosure. An operation of displaying content and additional content on a divided area of a display as shown in the operation 511 of FIG. 5 is described below.

Referring to FIG. 10, in operation 1001, if the additional content is generated to provide a duplication mode (e.g., the operation 509 of FIG. 5), the electronic device (e.g., the electronic device 201 or 301) may determine whether a main area is set in the duplication mode. For example, the processor 220 may determine whether the main area is set based on a feature of content displayed on at least one display area through the duplication mode. For example, if a web page or content for editing an image through the duplication mode is displayed, the processor 220 may set the main area.

In operation 1007, if the main area is not set, the electronic device may display the content and the additional content on different areas among divided areas included in the display. For example, the processor 220 may display the content on any one area between 1$^{st}$ and 2$^{nd}$ areas divided from the display 260, and may display the additional content on the other area.

In operation 1003, if the main area is set, the electronic device may determine whether a display-enabled area capable of displaying the content is present among the divided areas of the display. For example, the processor 220 may determine whether a divided area capable of displaying content which is zoomed out with a reference ratio is present among the divided areas of the display.

In operation 1007, in the presence of the display-enabled area capable of displaying the content among the divided areas of the display, the electronic device may display the content on the display-enabled area of the content, and may display the additional content on the remaining display areas.

In operation 1005, in the absence of the display-enabled area capable of displaying the content among the divided areas of the display, the electronic device may update a size of the divided area for displaying the content. For example, the processor 220 may update the size of the divided areas for the display 260 in association with the size of the content which is zoomed out with the reference ratio.

In operation 1007, the electronic device may display the content on the divided area whose size is updated to display the content, and may display the additional content by using the remaining display areas.

According to one embodiment, the electronic device may divide the display into a plurality of display areas based on a size of the main area. For example, the processor 220 may identify a size by which the content to be displayed on the main area is zoomed out with the reference ratio. The processor 220 may set the main area such that the content zoomed out with the reference ratio can be displayed thereon, and may set the remaining areas as a display area for displaying the additional content.

FIGS. 11A to 11D illustrate a screen configuration for setting an area for displaying content in an electronic device according to various embodiments of the present disclosure. An operation of dividing a display into a plurality of areas based on a size of content to be displayed on a main area is described below.

Figure 11B:
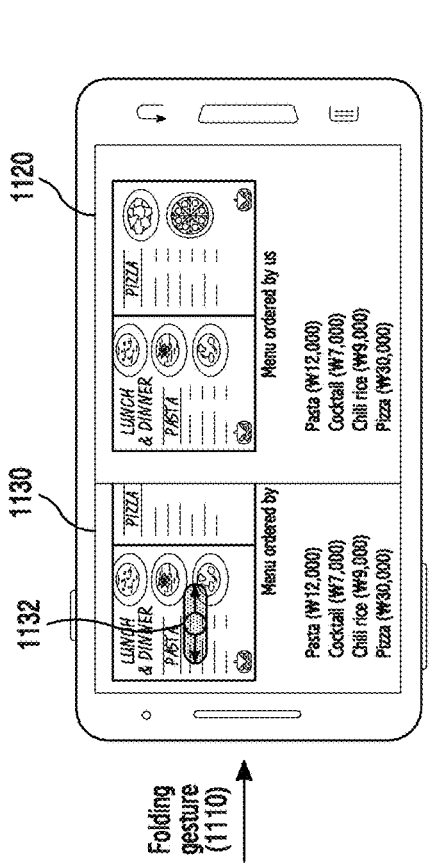
FIGS. 11A, 11B, 11C, and 11D illustrate a screen configuration for setting an area for displaying content in an electronic device according to various embodiments of the present disclosure.
Figure 11C:
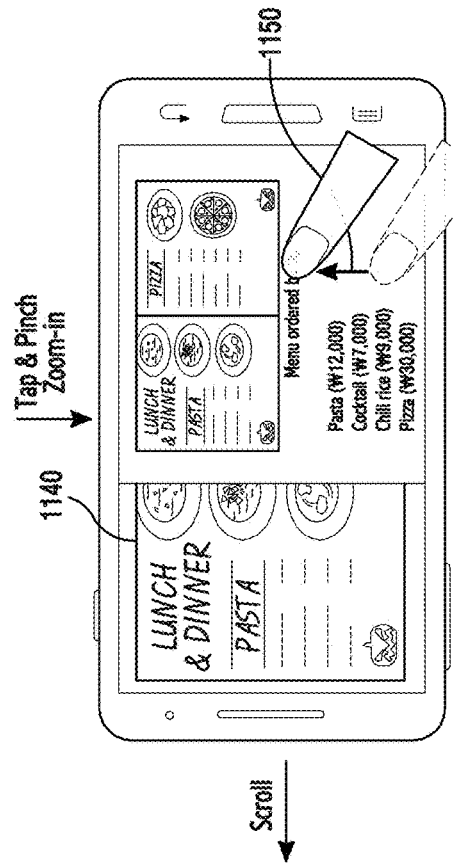
Figure 11A:
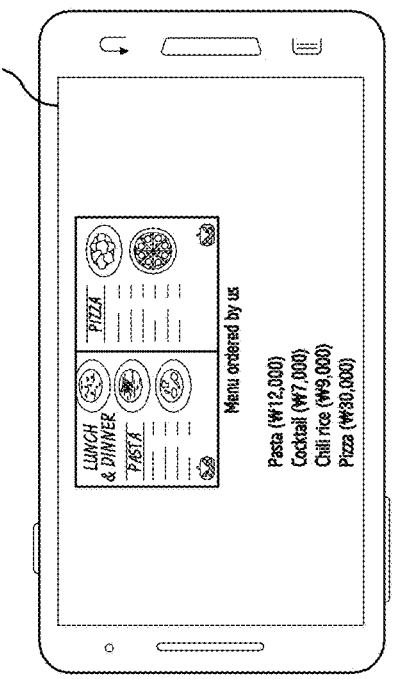

Referring to FIGS. 11A to 11D, if a browser application (e.g., the browser 475 of FIG. 4) is executed, as shown in FIG. 11A, the electronic device (e.g., the electronic device 201 or 301) may display an execution screen (content) 1100 of the browser on the display. For example, upon detecting an execution input of the browser through the input/output interface 250, the processor 220 may control the display 260 to display the execution screen 1100 of the browser on at least one part or entire parts of the display 260.

Upon detecting shape change information of the display by a folding gesture 1110, the electronic device may determine a size of a main area capable of displaying the content (the execution screen of the browser). For example, the processor 220 may determine the size of the main screen on which the execution screen of the browser can be displayed by being zoomed out with a reference ratio (e.g., 70 to 80%). Accordingly, as shown in FIG. 11B, the electronic device may display the execution screen (content) of the browser zoomed out with the reference ratio on a main area 1120, and may display additional content duplicated from the execution screen of the browser on a remaining display area 1130. For example, as shown in FIGS. 7A to 7C, the folding gesture 1110 may include a series of inputs for folding and unfolding the display.

According to one embodiment, upon detecting shape change information of the display by the folding gesture 1110 in a state where a touch on the display is maintained, the electronic device may determine a size of the main area capable of displaying the content (the execution screen of the browser).

According to one embodiment, as shown in FIG. 11B, upon detecting a zoom-in input on additional content (see 1132), as shown in FIG. 11C, the electronic device may zoom in and display the additional content displayed on the remaining display area 1130 (see 1140). For example, the processor 220 may detect the touch input 1132 for zooming in the additional content through the remaining display area 1130. The processor 220 may control the display 260 to zoom in and display the additional content displayed on the remaining display area 1130 in association with the touch input in a state where the content displayed on the main area 1120 is maintained.

Figure 11D:
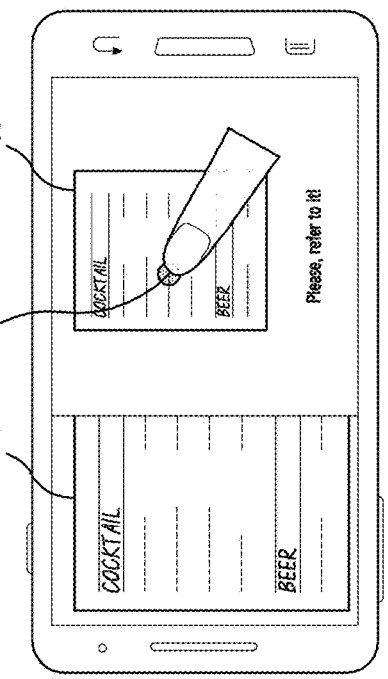

According to one embodiment, as shown in FIG. 11C, upon detecting a scroll input on the main area 1120 (see 1150), as shown in FIG. 11D, the electronic device may scroll the execution screen of the browser displayed on the main area 1120 in association with the scroll input (see 1160). In this case, additional content zoomed in and displayed on the remaining display area 1130 may be maintained. As shown in FIG. 11D, upon detecting a touch input on the execution screen of the browser displayed on the main area 1120 (see 1162), an execution screen of an area for which a touch input is detected may be zoomed in and displayed on the remaining display area 1130 (see 1170). For example, the electronic device may scroll additional content displayed on the remaining display area 1130 so that a point at which the touch input is detected is zoomed in and displayed on the main area 1120 (see 1170).

According to one embodiment, as shown in FIG. 11C, upon detecting a scroll input on the main area 1120 (see 1150), as shown in FIG. 11D, the electronic device may scroll the execution screen of the browser displayed on the main area 1120 in association with the scroll input (see 1160). In this case, the remaining display area 1130 may scroll additional content in association with a change of the content displayed on the main area 1120. For example, the electronic device may scroll the additional content in association with the scroll of the main area 1120 while maintaining a zoom-in ratio of the remaining display area 1130. That is, the execution screen of the browser displayed on the main area 1120 through the scroll may be zoomed in and displayed on the remaining display area 1130.

Figure 12:
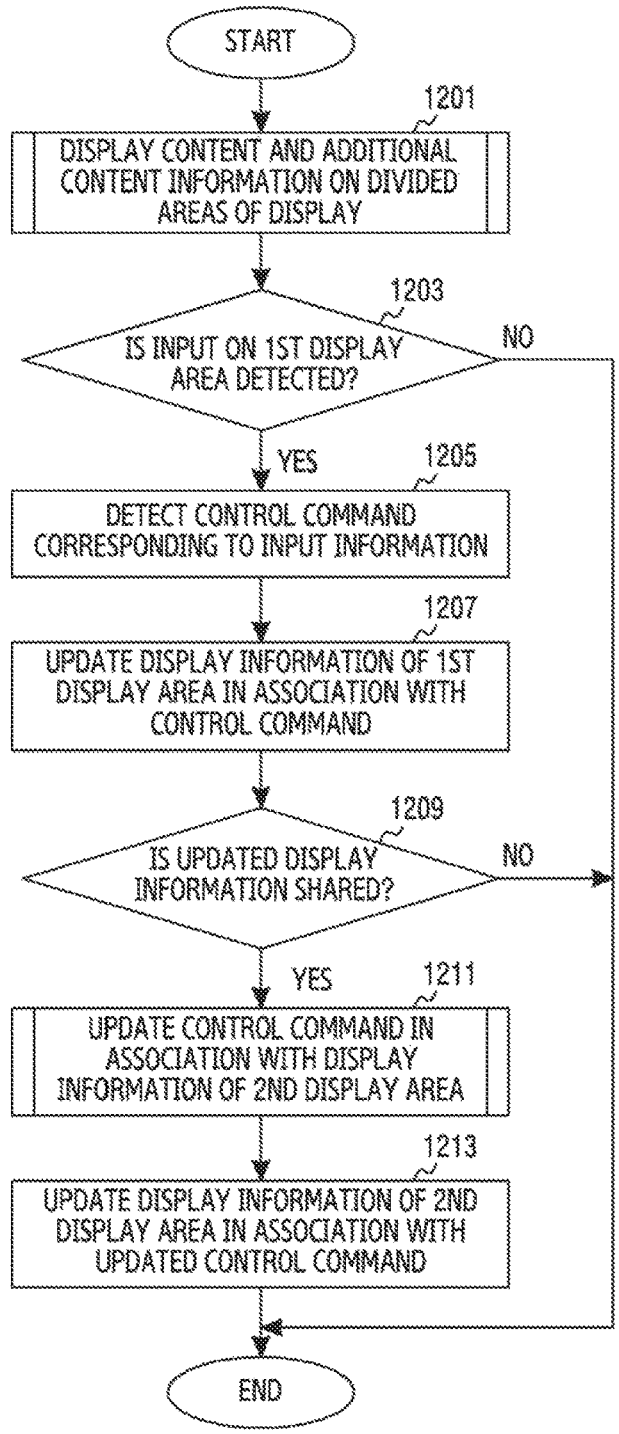
FIG. 12 illustrates a flowchart for sharing screen update information through a duplication mode in an electronic device according to embodiment of the present disclosure.

FIG. 12 illustrates a flowchart for sharing screen update information through a duplication mode in an electronic device according to an embodiment of the present disclosure. FIGS. 14A to 14D illustrate a screen configuration for controlling map content through a duplication mode in an electronic device according to an embodiment of the present disclosure. An operation of sharing screen update information by using the screen configuration of FIGS. 14A to 14D is described below.

Referring to FIGS. 12 and 14A to 14D, in operation 1201, the electronic device (e.g., the electronic device 201 or 301) may display content and additional content information on a divided area of a display based on the duplication mode. For example, as described in the operations 501 to 511 of FIG. 5, the processor 220 may display the content and the additional content on different divided areas of the display to provide the duplication mode. More specifically, upon detecting a user input for executing a map application, as shown in FIG. 14A, the processor 220 may control the display 260 to display a map image 1400. Upon detecting shape change information of the display 260 by a folding gesture 1410 in a state where a touch on the display 260 is maintained, as shown in FIG. 14B, the processor 220 may display the map image to a 1$^{st}$ area 1420 of the display 260, and may duplicate and display the map image on a 2$^{nd}$ area 1430.

In operation 1203, the electronic device may determine whether an input on a 1$^{st}$ display area is detected among a plurality of display areas of the display divided to provide the duplication mode. For example, as shown in FIG. 14B, the processor 220 may determine whether a touch input 1440 is detected through the 2$^{nd}$ area 1430.

In operation 1205, upon detecting the input on the 1$^{st}$ display area, the electronic device may detect a control command corresponding to input information. For example, as shown in FIG. 14B, upon detecting the touch input 1440 through the 2$^{nd}$ area 1430, the processor 220 may detect a control command corresponding to the touch input 1440 for controlling the duplicated map image displayed on the 2$^{nd}$ area 1430. For example, the control command may include a command for editing content displayed on the display area, such as object inserting, deleting, zooming in, zooming out, moving, or the like.

In operation 1207, the electronic device may update display information of the 1$^{st}$ display area in association with the control command detected based on the input information. For example, as shown in FIG. 14B, the processor 220 may detect a control command "zoom-in" corresponding to the touch input 1440 detected through the 2$^{nd}$ area 1430. Accordingly, as shown in FIG. 14C, the processor 220 may control the display 260 so that the duplicated map image of the 2$^{nd}$ area 1430 is zoomed in and displayed (see 1450) based on the touch input 1440 (see 1450). For example, as shown in FIG. 14C, the processor 220 may detect a control command "move" corresponding to a touch input 1460 detected through the 2$^{nd}$ area 1430. Accordingly, as shown in FIG. 14D, the processor 220 may control the display 260 so that the map image zoomed in and displayed on the 2$^{nd}$ area 1430 is moved based on the touch input 1460 (see 1470).

In operation 1209, the electronic device may determine whether updated display information of the 1$^{st}$ display area can be shared. For example, the processor 220 may determine whether the updated display information is applicable to the 2$^{nd}$ display area based on a type of the control command for updating the display information of the 1$^{st}$ display area. For example, as shown in FIG. 14C, if the map image is zoomed in and displayed on the 2$^{nd}$ area 1430 based on the control command "zoom-in" (see 1450), the processor 220 may determine that the map image zoomed in based on the control command "zoom-in" is not shared with another area. For example, as shown in FIG. 14D, if the map image displayed on the 2$^{nd}$ area 1430 is moved based on the control command "move" (see 1470), the processor 220 may determine that the map image updated based on the control command "move" is shared with another area.

In operation 1211, upon determining that the updated display information of the 1$^{st}$ display area is shared, the electronic device may update the control command for updating the display information of the 1$^{st}$ display area in association with the display information of the 2$^{nd}$ display area. For example, the processor 220 may update the control command based on a difference of a display feature (e.g., a display ratio) of the 1$^{st}$ display area and the 2$^{nd}$ display area. For example, as shown in FIG. 14D, if the duplicated map image is moved to the 2$^{nd}$ area 1430 (see 1470), the processor 220 may detect a difference of display images of the map images displayed on the 1$^{st}$ area 1420 and the 2$^{nd}$ area 1430. The processor 220 may update a movement distance of the map image displayed on the 2$^{nd}$ area 1430 in association with the display ratio difference and thus may determine a movement distance of the map image displayed on the 1$^{st}$ area 1420.

In operation 1213, the electronic device may update display information displayed on the 2$^{nd}$ display area in association with the control command updated in association with the display information of the 2$^{nd}$ display area. For example, as shown in FIG. 14D, the processor 220 may move the map image displayed on the 1$^{st}$ area 1420 based on the movement distance of the map image updated in association with the difference of display ratios of the 1$^{st}$ area 1420 and the 2$^{nd}$ area 1430 (see 1480).

Figure 13:
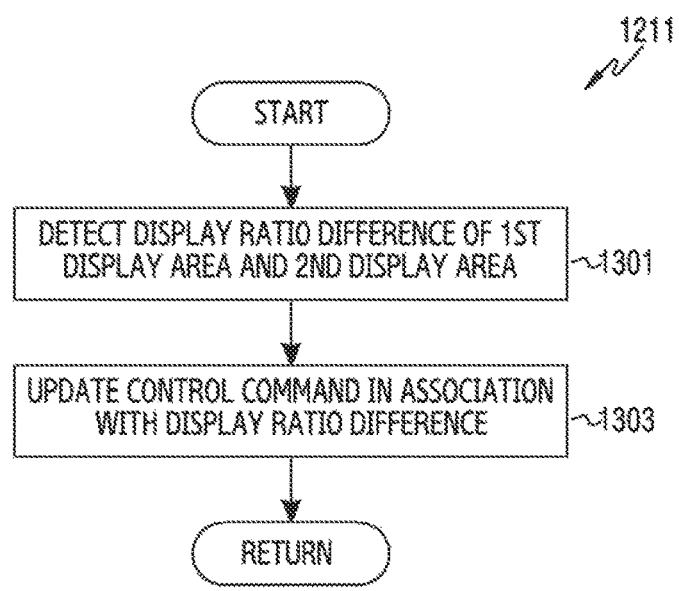
FIG. 13 illustrates a flowchart for updating screen information in an electronic device according to embodiment of the present disclosure.

FIG. 13 illustrates a flowchart for updating screen information in an electronic device according to an embodiment of the present disclosure. An operation of updating a control command as shown in the operation 1211 of FIG. 12 is described below.

Referring to FIG. 13, in operation 1301, if display information updated through a duplication mode is shared (e.g., the operation 1209 of FIG. 12), the electronic device (e.g., the electronic device 201 or 301) may detect a difference of display ratios of a 1$^{st}$ display area and a 2$^{nd}$ display area which are divided from a display. For example, as shown in FIG. 14D, the processor 220 may control the display 260 to move and display a duplicated map image on the 2$^{nd}$ area 1430 based on a touch input detected through the 2$^{nd}$ area 1430 of the display 260 (see 1470). If movement information of the map image displayed on the 2$^{nd}$ area 1430 is shared with the 1$^{st}$ area 1420, the processor 220 may detect the difference of display ratios of the map images displayed on the 1$^{st}$ area 1420 and the 2$^{nd}$ area 1430.

In operation 1303, the electronic device may update a control command for applying to display information in association with the difference of display ratios of the 1$^{st}$ display area and 2$^{nd}$ display area of the display. For example, in FIG. 14D, the processor 220 may update a distance, by which the map image displayed on the 2$^{nd}$ area 1430 is moved, in association with the difference of display ratios. As shown in FIG. 14D, the processor 220 may control the display 260 such that the map image displayed on the 1$^{st}$ area 1420 is moved based on the updated movement distance (see 1480).

FIGS. 15A to 15D illustrate a screen configuration for generating an image through a duplication mode in an electronic device according to various embodiments of the present disclosure. An operation of sharing screen update information is described below.

Referring to FIGS. 15A to 15D, if a memo application (e.g., a note application) is executed, as shown in FIG. 15A, the electronic device (e.g., the electronic device 201 or 301) may display an execution screen (content) 1500 of the memo application. For example, the processor 220 may control the display 260 such that guide information for a folding gesture is displayed on the execution screen of the memo application.

Upon detecting shape change information of the display by a folding gesture 1510, the electronic device may generate additional content duplicated from the execution screen (content) of the memo application. For example, the processor 220 may duplicate a configuration for the execution screen of the memo application to generate an execution screen of an additional memo application.

According to one embodiment, upon detecting the shape change information of the display by the folding gesture 1510 in a state where a touch on the display is maintained, the electronic device may duplicate the content (the execution screen of the memo application).

As shown in FIG. 15B, the electronic device may display the execution screen (content) of the memo application on a 1$^{st}$ area 1520, and may display additional content duplicated from the execution screen of the memo application on a 2$^{nd}$ area 1530. For example, the 1$^{st}$ area 1520 and 2$^{nd}$ area 1530 of the display may be divided with the same size, or may be divided in association with a rotation axis by which a shape of the display is changed.

According to one embodiment, if the display is divided into the 1$^{st}$ area 1520 and the 2$^{nd}$ area 1530 to control the content for the memo application, the electronic device may additionally display a tool bar for controlling the content on at least one area of the display. For example, the processor 220 may additionally display a tool bar for the memo application between the 1$^{st}$ area 1520 and 2$^{nd}$ area 1530 of the display.

According to one embodiment, as shown in FIG. 15B, upon detecting a zoom-in input on the 2$^{nd}$ area 1530 on which additional content is displayed (see 1540), the electronic device may update a display ratio of the 2$^{nd}$ area 1530 in association with the zoom-in input. For example, the processor 220 may update the display ratio of the 2$^{nd}$ area 1530 in association with the zoom-in input while maintaining the display ratio of the 1$^{st}$ area 1520. For example, upon determining an interval change of multi-touch points as the zoom-in input, the processor 220 may increase the display ratio of the 2$^{nd}$ area 1530 in association with a distance change by which an interval between the multi-touch points is separated.

According to one embodiment, as shown in FIG. 15C, upon detecting input information regarding the 2$^{nd}$ area 1530, the electronic device may display the display information corresponding to input information in association with the display ratio (e.g., 350%) for the 2$^{nd}$ area 1530 (see 1550). In this case, as shown in FIG. 15C, the electronic device may display the display information regarding the 2$^{nd}$ area 1530 on the 1$^{st}$ area 1520 by changing a shape thereof in association with the 1$^{st}$ area 1520 (see 1560). For example, the processor 220 may display an image, which is to be drawn by using touch information regarding the 2$^{nd}$ area 1530, on the 2$^{nd}$ area 1530 in association with the display ratio of the 2$^{nd}$ area 1530. In this case, the processor 220 may display an image, which is to be displayed on the 2$^{nd}$ area 1530, on the 1$^{st}$ area 1520 by changing a size of the image in association with the display ratio (e.g., 100%) of the 1$^{st}$ area 1520. For example, if display information regarding any one area between the 1$^{st}$ area 1520 and the 2$^{nd}$ area 1530 is updated, the processor 220 may provide control such that the updated display information is shared with another area on a real-time basis.

According to one embodiment, upon detecting a zoom-out input on the 2$^{nd}$ area 1530 on which additional content is displayed (see 1570), the electronic device may update the display ratio of the 2$^{nd}$ area 1530 in association with the zoom-out input (see 1580). For example, upon determining an interval change of the multi-touch points as the zoom-out input, the processor 220 may reduce the display ratio of the 2$^{nd}$ area 1530 in association with a distance change in which an interval between the multi-touch points is decreased.

Figure 16:
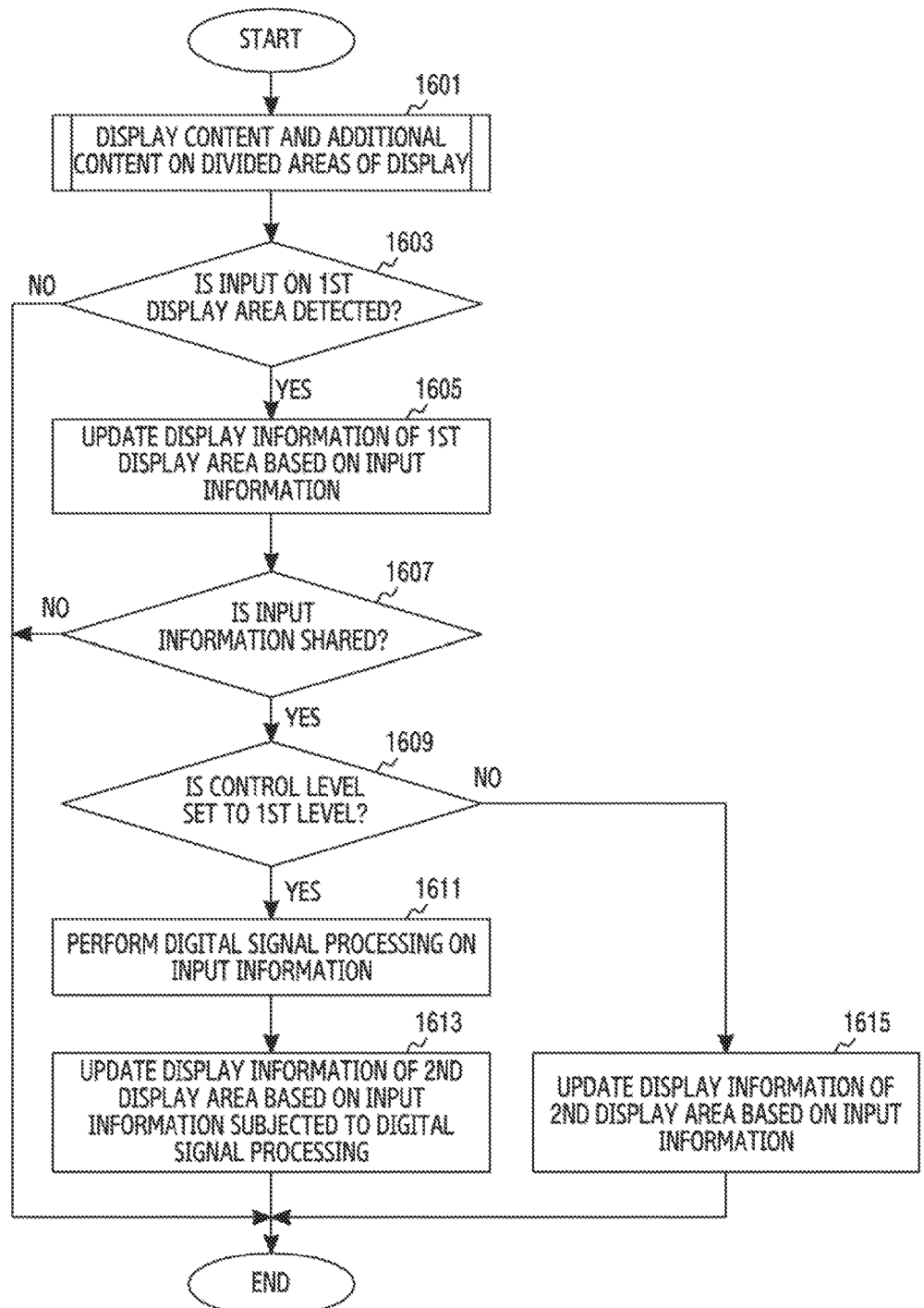
FIG. 16 illustrates a flowchart for sharing input information through a duplication mode in an electronic device according to embodiment of the present disclosure.

FIG. 16 illustrates a flowchart for sharing input information through a duplication mode in an electronic device according to an embodiment of the present disclosure.

Referring to FIG. 16, in operation 1601, upon detecting shape change information of a display by a folding gesture, the electronic device (e.g., the electronic device 201 or 301) may display content and additional content information on a divided area of the display. For example, as shown in the operations 501 to 511 of FIG. 5, if the display 260 is folded and unfolded by the folding gesture in a state where a touch on the display 260 is maintained, the processor 220 may duplicate and additionally display the content displayed on the display 260.

In operation 1603, the electronic device may determine whether an input on a 1$^{st}$ display area is detected among a plurality of display areas of the divided display based on the shape change information of the display. For example, the processor 220 may determine whether a display area on which a touch input is detected is present among the respective display areas included in the display 260.

In operation 1605, upon detecting an input on the $1^{st}$ display area, the electronic device may update display information of the $1^{st}$ display area based on input information. For example, upon detecting a touch input on the $1^{st}$ display area of the display 260, the processor 220 may control the display 260 to insert an object corresponding to the touch input on the $1^{st}$ display area.

In operation 1607, the electronic device may determine whether the input information detected through the $1^{st}$ display area can be shared. For example, the processor 220 may determine whether input information updated based on a type of a control command corresponding to the touch input detected through the $1^{st}$ display area can be applied to the $2^{nd}$ display area.

In operation 1609, upon determining that the input information detected through the $1^{st}$ display area is shared, the electronic device may determine whether a control level of the duplication mode is set to a $1^{st}$ level. For example, if the duplication mode is executed based on the shape change information of the display 260, the processor 220 may determine the control level of the duplication mode based on rotation information of the electronic device 201. Further, the processor may generate additional content for duplicating content based on the control level of the duplication mode. Accordingly, the processor 220 may identify the control level of the duplication mode considered when the additional content is generated. For example, the $1^{st}$ level may indicate a control level shared with another display area by digitalizing input information detected through any one display area constituting the display 260 through digital signal processing.

In operation 1611, if the control level of the duplication mode is set to the $1^{st}$ level, the electronic device may perform a digital signal processing on the input information detected through a $1^{st}$ display area. For example, the processor 220 may correct a distortion of an image to be displayed through the input information by performing the digital signal processing on the input information detected through the $1^{st}$ display area.

In operation 1613, the electronic device may update display information of a $2^{nd}$ display area based on the input information subjected to the digital signal processing. For example, the processor 220 may control the display 260 to insert an object whose distortion is corrected through the digital signal processing into the $2^{nd}$ display area of the display 260.

In operation 1615, if the control level of the duplication mode is set to a $2^{nd}$ level, the electronic device may update display information of the $2^{nd}$ display area based on the input information detected through the $1^{st}$ display area. For example, the processor 220 may control the display 260 to insert an object, which has the same shape as the object inserted into the $1^{st}$ display area, into the $2^{nd}$ display area based on the input information detected through the $1^{st}$ display area of the display 260.

FIGS. 17A to 17E illustrate a screen configuration for providing a direction guide service based on input information in an electronic device according to various embodiments of the present disclosure. An operation for sharing input information in association with a $1^{st}$ control level of a duplication mode as shown in the operations 1611 to 1613 of FIG. 16 is described below.

Referring to FIGS. 17A to 17E, if a map application is executed, as shown in FIG. 17A or FIG. 17B, the electronic device (e.g., the electronic device 201 or 301) may display an execution screen (content) 1700 or 1710 of the map application on a display. For example, if the electronic device 201 is set to a $2^{nd}$ direction (e.g., a landscape direction), as shown in FIG. 17A, the processor 220 may display the map image 1700 in the landscape direction. For example, if the electronic device 201 is set to a $1^{st}$ direction (e.g., a portrait direction), as shown in FIG. 17B, the processor 220 may display the map image 1710 in the portrait direction.

According to one embodiment, as shown in FIG. 17A, upon detecting shape change information of a display and rotation information of the electronic device due to a folding gesture in a state where the electronic device is set to the $2^{nd}$ direction (see 1702), the electronic device may generate additional content by duplicating a map image displayed on the display. As shown in FIG. 17C, based on the rotation information of the electronic device, the electronic device may display the map image (content) on a $1^{st}$ area 1720 divided in a portrait direction, and may display additional content (a duplicated map image) on a $2^{nd}$ area 1730. In this case, the electronic device may set a control level of the duplication mode to a $1^{st}$ level based on the rotation information of the electronic device.

According to one embodiment, as shown in FIG. 17B, upon detecting shape change information of a display due to a folding gesture in a state where the electronic device is set to the $1^{st}$ direction (see 1712), the electronic device may generate additional content by duplicating the map image displayed on the display. As shown in FIG. 17C, based on the rotation information of the electronic device, the electronic device may display the map image (content) on the $1^{st}$ area 1720 divided in the portrait direction, and may display the duplicated map image (additional content) on the $2^{nd}$ area 1730. In this case, the electronic device may set the control level of the duplication mode to the $1^{st}$ level based on the direction (e.g., the $1^{st}$ direction) of the electronic device.

According to one embodiment, as shown in FIG. 17C, upon detecting a zoom-in input on a $2^{nd}$ area 1730 on which the duplicated map image is displayed (see 1740), as shown in FIG. 17D, the electronic device may update a display ratio of the $1^{st}$ area 1720 in association with the zoom-in input (see 1750). For example, the processor 220 may update the display ratio of the map image (content) displayed on the $1^{st}$ area 1720 in association with the zoom-in input while maintaining the display ratio of the duplicated map image (additional content) displayed on the $2^{nd}$ area 1730.

According to one embodiment, as shown in FIG. 17D, upon detecting input information regarding the $2^{nd}$ area 1730 (see 1760), as shown in FIG. 17E, the electronic device may update display information of the $1^{st}$ area 1720 in association with a control command corresponding to the input information (see 1770). For example, upon detecting information regarding a touch movement greater than or equal to a specific distance through the $2^{nd}$ area 1730, the processor 220 may extract a direction guide command between points connected by the touch movement. The processor 220 may control the display 260 to update the map image of the $1^{st}$ area 1720 to a direction guide image (e.g., a road view) in association with the direction guide command. In addition, upon providing the direction guide image through the $1^{st}$ area 1720, the processor 220 may control the display 260 to display additional information 1780 for the direction guide on the 2$^{nd}$ area 1730 in association with the display information update of the 1$^{st}$ area 1720.

According to various embodiments of the present disclosure, as shown in FIG. 17C, upon detecting a zoom-in input on the 2$^{nd}$ area 1730 on which the duplicated map image is displayed (see 1740), the electronic device may update the display ratio of the 2$^{nd}$ area 1730 in association with the zoom-in input. For example, the processor 220 may update the display ratio of the duplicated map image (additional content) displayed on the 2$^{nd}$ area 1730 in association with the zoom-in input while maintaining the display ratio of the map image (content) displayed on the 1$^{st}$ area 1720.

FIGS. 18A to 18D illustrate a screen configuration for sharing input information through a duplication mode by performing a digital signal processing in an electronic device according to various embodiments of the present disclosure. An operation for sharing input information in association with a 1$^{st}$ control level of a duplication mode as shown in the operations 1611 to 1613 of FIG. 16 is described below.

Figure 18A:
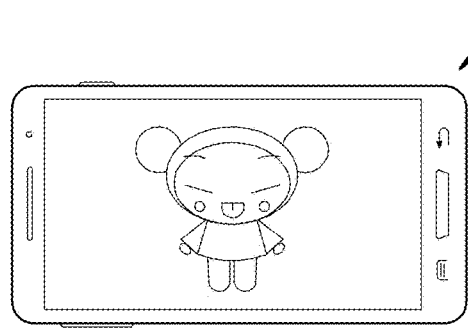
FIGS. 18A, 18B, 18C, and 18D illustrate a screen configuration for sharing input information through a duplication mode by performing a digital signal processing in an electronic device according to various embodiments of the present disclosure.

Referring to FIGS. 18A to 18D, if an image editing application is executed, as shown in FIG. 18A, the electronic device (e.g., the electronic device 201 or 301) may display an image (content) 1800 to be edited in the image editing application on the display. For example, if the electronic device 201 is set to a 2$^{nd}$ direction (e.g., a landscape direction), as shown in FIG. 18A, the processor 220 may control the display 260 to display the image 1800 to be edited in the landscape direction.

Figure 18B:
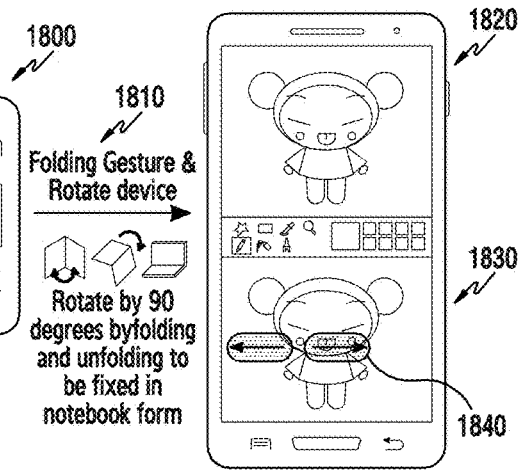

According to one embodiment, upon detecting shape change information of a display and rotation information of the electronic device due to a folding gesture (see 1810), the electronic device may generate additional content by duplicating a map image displayed on the display. As shown in FIG. 18B, based on the rotation information of the electronic device, the electronic device may display an image (content) to be edited on a 1$^{st}$ area 1820 divided in a portrait direction, and may display a duplicated image (additional content) on a 2$^{nd}$ area 1830. In this case, the electronic device may set the control level of the duplication mode to a 1$^{st}$ level based on the rotation information of the electronic device.

According to one embodiment, as shown in FIG. 18B, upon detecting a zoom-in input on the 2$^{nd}$ area 1830 on which the duplicated image is displayed (see 1840), the electronic device may update a display ratio of the 2$^{nd}$ area 1830 in association with the zoom-in input. For example, as shown in FIG. 18C, the processor 220 may update the display ratio of the image (content) displayed on the 1$^{st}$ area 1820 while maintaining the display ratio of the duplicated image (content) displayed on the 1$^{st}$ area 1820.

Figure 18D:
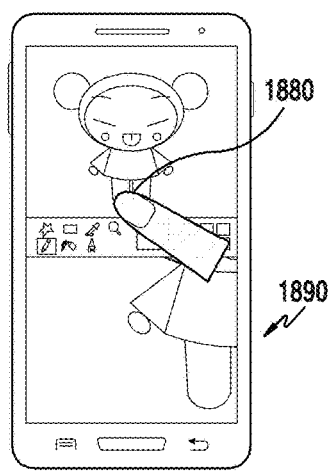
Figure 18C:
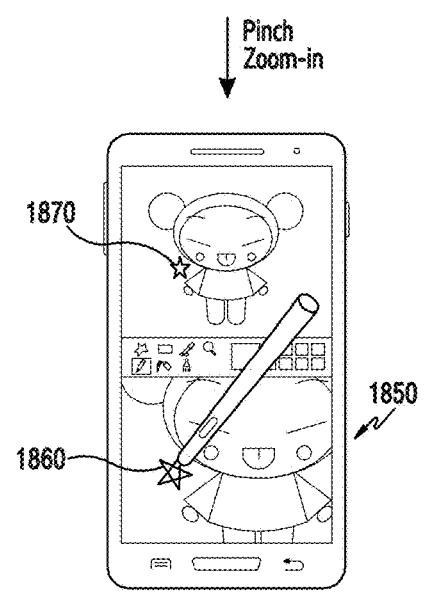

According to one embodiment, as shown in FIG. 18C, upon detecting input information for inserting an object into the 2$^{nd}$ area 1830 (see 1860), the electronic device may insert an object whose distortion is corrected through a digital signal processing on the input information (see 1870). In this case, the electronic device may display on the 2$^{nd}$ area 1830 an object corresponding to input information 1860 detected through the 2$^{nd}$ area 1830. For example, if the object is completely inserted into the 2$^{nd}$ area 1830 in association with the information regarding the 2$^{nd}$ area 1830, the processor 220 may insert an object corresponding to input information subjected to a digital signal processing into the 1$^{st}$ area 1820. In this case, if there is no additional input during a reference time, the processor 220 may determine that the object is completely inserted. For example, if at least one part of the object is displayed on the 2$^{nd}$ area 1830 based on the input information regarding the 2$^{nd}$ area 1830, the processor 220 may insert at least one part of the object corresponding to the input information subjected to a digital signal processing into the 1$^{st}$ area 1820. That is, the processor 220 may provide control such that update information of the 2$^{nd}$ area 1830 is applied to the 1$^{st}$ area 1820 on a real-time basis.

According to one embodiment, as shown in FIG. 18D, the electronic device may move an image displayed on the 2$^{nd}$ area 1830 in association with touch information 1880 of the image displayed on the 1$^{st}$ area 1820 (see 1890). For example, as shown in FIG. 18D, upon detecting a touch input on at least one part of the image (content) displayed on the 1$^{st}$ area 1820 (see 1880), the processor 220 may control the display 260 to move a duplicated image displayed on the 2$^{nd}$ area 1830 so that at least one part of an image on which a touch input is made is zoomed in and displayed (see 1890).

FIGS. 19A to 19D illustrate a screen configuration for sharing input information through a duplication mode in an electronic device according to various embodiments of the present disclosure. An operation for sharing input information in association with a 2$^{nd}$ control level of a duplication mode as shown in the operation 1615 of FIG. 16 is described below.

Referring to FIGS. 19A to 19D, if an image editing application is executed, as shown in FIG. 19A, the electronic device (e.g., the electronic device 201 or 301) may display an image (content) 1900 to be edited through the image editing application on the display in a landscape direction.

According to one embodiment, upon detecting shape change information of a display due to a folding gesture (see 1910), as shown in FIG. 19B, the electronic device may duplicate an image displayed on the display and then may display it on a display area different from the content. For example, based on a direction of the electronic device 201, as shown in FIG. 19B, the processor 220 may display an image (content) for editing a 1$^{st}$ area 1920 divided in a landscape direction, and may display a duplicated image (additional content) on a 2$^{nd}$ area 1930. In this case, the electronic device may set a control level of the duplication mode to a 2$^{nd}$ level based on the rotation information of the electronic device.

According to one embodiment, as shown in FIG. 19B, upon detecting a zoom-in input on the 2$^{nd}$ area 1930 on which the duplicated image is displayed (see 1940), the electronic device may zoom in the duplicated image (additional content) displayed on the 2$^{nd}$ area 1930 in association with the zoom-in input (see 1950). In this case, the electronic device may maintain a display ratio of the image (content) displayed on the 1$^{st}$ area 1820.

According to one embodiment, as shown in FIG. 19C, upon detecting input information for inserting an object into the 2$^{nd}$ area 1930 (see 1960), the electronic device may display the object corresponding to the input information on the 2$^{nd}$ area 1930. In addition, the electronic device may insert the object corresponding to the input information detected through the 2$^{nd}$ area 1930 into the 1$^{st}$ area 1920 (see 1970). For example, the processor 220 may update the object such that a size of the object inserted into the 2$^{nd}$ area 1930 is in association with a display ratio of the 1$^{st}$ area 1920. The processor 220 may insert the object updated in association with the display ratio of the 1$^{st}$ area 1920 into the 1$^{st}$ area 1920. For example, the processor 220 may control the display 260 to insert a corresponding object at a location of the 1$^{st}$ area 1920 corresponding to a location at which the object is inserted based on display information of the 2$^{nd}$ area 1930.

According to one embodiment, as shown in FIG. 19D, upon detecting a touch input on an image displayed on the 1$^{st}$ area 1920 (see 1980), the electronic device may control the display 260 to move a duplicated image displayed on the 2$^{nd}$ area 1930 so that at least one part of an image on which a touch input is made is zoomed in and displayed (see 1990).

FIGS. 20A to 20C illustrate a screen configuration for providing a memo function through a duplication mode in an electronic device according to various embodiments of the present disclosure. An operation for displaying content and additional content in association with a control level of a duplication mode is described below.

Referring to FIGS. 20A to 20C, if a memo application (e.g., a note application) is executed, as shown in FIG. 20A, the electronic device (e.g., the electronic device 201 or 301) may display an execution screen (content) 2000 of the memo application. For example, if the memo application is executed, the processor 220 may control the display 260 to display the pre-stored memo information.

According to one embodiment, upon detecting shape change information of a display and rotation information of the electronic device due to a folding gesture (see 2010), as shown in FIG. 20B, the electronic device may display an execution screen of the memo application on a 1$^{st}$ area 2020 of the display, and may duplicate the execution screen of the memo application and display it on a 2$^{nd}$ area 2030. In this case, the electronic device may display the execution screen of the memo application on the 1$^{st}$ area 2020 by performing a digital signal processing based on the rotation information of the electronic device. For example, upon detecting the rotation information of the electronic device together with shape change information of the display due to a folding gesture, the processor 220 may set a control level of the duplication mode to a 1$^{st}$ level. Accordingly, the processor 220 may control the display 260 to display data by correcting a distortion of the data displayed on the execution screen of the memo application. For example, as shown in FIG. 20A, the execution screen displayed on the display 260 may be duplicated and displayed on the 2$^{nd}$ area 2030.

According to one embodiment, upon detecting the shape change information of the display due to a folding gesture 2040, as shown in FIG. 20C, the electronic device may display the execution screen (content) of the memo application on a 1$^{st}$ area 2050, and may duplicate the execution screen and display it on a 2$^{nd}$ area 2060. For example, as shown in FIG. 20A, the processor 220 may duplicate the execution screen displayed on the display 260 and display it on the 1$^{st}$ area 2050 and the 2$^{nd}$ area 2060.

FIGS. 21A to 21E illustrate a screen configuration for providing a memo function in association with a control level of a duplication mode in an electronic device according to various embodiments of the present disclosure. An operation for sharing input information in association with a control level of a duplication mode as shown in the operations 1601 to 1615 of FIG. 16 is described below.

Referring to FIGS. 21A to 21E, according to one embodiment, the electronic device (e.g., the electronic device 201 or 301) may execute a memo application (e.g., a note application) based on input information detected through an input/output interface (e.g., the input/output interface 250 of FIG. 2). In this case, as shown in FIG. 21A, the electronic device may display an execution screen (content) 2100 of the memo application on a display. For example, as shown in FIG. 21A, the execution screen of the memo application may include guide information regarding a folding gesture.

According to one embodiment, as shown in FIG. 21A, the electronic device may detect shape change information of the display and rotation information of the electronic device due to a folding gesture in a state where the electronic device is set to a 2$^{nd}$ direction (e.g., a landscape direction) (see 2110). In this case, as shown in FIG. 21B, based on the rotation information of the electronic device, the electronic device may set a 1$^{st}$ area 2120 divided in a portrait direction as an area for displaying memo information, and may set a 2$^{nd}$ area 2130 as an area for a memo input. For example, the electronic device may set the control level of the duplication mode to a 1$^{st}$ level based on the rotation information of the electronic device.

According to one embodiment, as shown in FIG. 21C, upon detecting a memo input on the 2$^{nd}$ area 2130 (see 2140), the electronic device may display a memo whose distortion is corrected through a digital signal processing on the memo input (see 2150). In this case, the electronic device may display on the 2$^{nd}$ area 2130 a memo corresponding to input information 2140 detected through the 2$^{nd}$ area 2310. For example, if a handwriting is input through the 2$^{nd}$ area 2130, the processor 220 may control the display 260 to display a memo having a shape of the input handwriting on the 2$^{nd}$ area 2130 and to display on the 1$^{st}$ area 2120 a memo in which the handwriting is digitalized.

According to one embodiment, as shown in FIG. 21D, upon detecting a scroll input on a memo displayed on the 2$^{nd}$ area 2130 (see 2160), as shown in FIG. 21E, the electronic device may scroll a memo input displayed on the 2$^{nd}$ area 2130 in association with the scroll input (see 2170). In addition, as shown in FIG. 21E, the electronic device may scroll the memo displayed on the 1$^{st}$ area 2120 in association with the scroll of the 2$^{nd}$ area 2130 (see 2180). In this case, the electronic device may scroll the memo displayed on the 1$^{st}$ area 2120 by correcting a scroll interval in association with a display ratio of the 1$^{st}$ area 2120 and the 2$^{nd}$ area 2130.

FIGS. 22A to 22E illustrates a screen configuration for inputting a text in association with a control level of a duplication mode in an electronic device according to various embodiments of the present disclosure. An operation for sharing input information in association with a control level of a duplication mode as shown in the operations 1601 to 1615 of FIG. 16 is described below.

Referring to FIGS. 22A to 22E, according to one embodiment, upon detecting shape change information of a display and rotation information of the electronic device due to a folding gesture (see 2200), the electronic device (or the electronic device 201 or 301) may additionally display additional content duplicated from the execution screen (content) of the memo application. For example, if the electronic device 201 is in a first direction, as shown in FIG. 22A, the processor 220 may display the execution screen (content) of the memo application on a 1$^{st}$ area 2210 of the display 260 divided in a portrait direction, and may display the additional content duplicated from the execution screen of the memo application on a 2$^{nd}$ area 2212. In addition, the processor 220 may additionally display a tool bar for the memo application between the 1$^{st}$ area 2210 and the 2$^{nd}$ area 2212 in the display 260.

According to one embodiment, as shown in FIG. 22A, upon detecting input information of the tool bar (see 2220), the electronic device may activate a character input function based on the input information. For example, if the character input function is activated, the electronic device may set the 2$^{nd}$ area 2212 on which additional content is displayed as an area for the character input.

According to one embodiment, as shown in FIG. 22B, the electronic device may insert a memo into the 2$^{nd}$ area 2212 based on input information detected through the character input information (see 2222). In this case, the electronic device may insert the memo, which is inserted into the $2^{nd}$ area 2212, equally into the $1^{st}$ area (see 2224). In addition, if a memo in a handwriting form is inserted into the $2^{nd}$ area 2212, the electronic device may insert it into the $1^{st}$ area 2210 by digitalizing the memo in the handwriting form based on a $1^{st}$ level.

According to one embodiment, as shown in FIG. 22B, upon detecting a rotation of the electronic device during the duplication mode is provided (see 2230), as shown in FIG. 22C, the electronic device may display the $1^{st}$ area 2210 and $2^{nd}$ area 2212 of the display, which is disposed in a portrait direction, in a landscape direction in association with a rotation of the electronic device (see 2240 and 2242). In this case, the electronic device may change the control level of the duplication mode to a $2^{nd}$ level based on a direction of the electronic device.

According to one embodiment, as shown in FIG. 22C, upon detecting an input for inserting an image into a $2^{nd}$ area 2242 on which additional content is displayed (see 2244), the electronic device may display an image (e.g., a heart image) corresponding to an input of the $2^{nd}$ area 2242. In addition, the electronic device may equally insert an image, which is inserted into the $2^{nd}$ area 2242 according to the $2^{nd}$ level, into the $1^{st}$ area 2240 (see 2246).

According to one embodiment, as shown in FIG. 22C, upon detecting a scroll input on the $2^{nd}$ area 2242 (see 2250), as shown in FIG. 22D, the electronic device may scroll display information displayed on the $2^{nd}$ area 2242 in association with the scroll input (see 2260). In addition, as shown in FIG. 22D, the electronic device may scroll display information displayed on the $1^{st}$ area 2240 in association with a scroll of the $2^{nd}$ area 2242 (see 2262).

According to one embodiment, as shown in FIG. 22E, the electronic device may additionally insert a memo into the $2^{nd}$ area 2242 based on input information detected through the character input function (see 2270). For example, upon detecting a memo input in a handwriting form through the $2^{nd}$ area 2242, the processor 220 may insert the memo in the handwriting form into the $2^{nd}$ area 2242 in association with an input form. In this case, the processor 220 may equally insert a memo, which is additionally inserted into a $2^{nd}$ area 2242 according to a control level set to a $2^{nd}$ level, into the $1^{st}$ area 2240. More specifically, as shown in FIG. 22E, if the memo in the handwriting form is inserted into the $2^{nd}$ area 2242, the processor 220 may equally insert the memo in the handwriting form into the $1^{st}$ area 2240.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 220), may cause the one or more processors to execute the function corresponding to the instruction. The computer-readable storage medium may be, for example, the memory 230.

The computer readable recoding medium may include a hard disk, a floppy disk, magnetic media (for example, a magnetic tape), optical media (for example, a compact disc read only memory (CD-ROM) and a digital versatile disc (DVD)), magneto-optical media (for example, a floptical disk), a hardware device (for example, a read only memory (ROM), a random access memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display having a changeable shape;
a sensor; and
at least one processor configured to:
  display a first content on the display,
  detect a touch on the display,
  detect a shape change of the display through the sensor while the detected touch is maintained on the display,
  divide the display into a first display area and a second display area based on the detecting of the shape change while the detected touch is maintained,
  display the first content on the first display area of the display and a second content associated with the first content on the second display area of the display,
  receive a user input on the first content displayed on the first display area,
  control, when a direction of the electronic device is a first direction, an update to be displayed on the first content, wherein the update is based on the received user input, and
  control the update to be simultaneously displayed on the second content displayed on the second display area based on the received user input on the first content displayed on the first display area.

2. The electronic device of claim 1, wherein the display comprises a flexible display.

3. The electronic device of claim 1, wherein the at least one processor is further configured to:

determine control information according to a rotation of the direction of the electronic device while detecting the shape change of the display.

4. The electronic device of claim 1,
wherein the second content includes content duplicated from the first content, and
wherein the at least one processor is further configured to:
    duplicate configuration information for the first content, and
    generate the second content based on the duplicated configuration information.

5. The electronic device of claim 1, wherein the at least one processor is further configured to:
    determine a size of the first display area for the first content, and
    determine a size of a second display area for the second content based on the size of the first display area.

6. The electronic device of claim 1, wherein the at least one processor is further configured to:
    control, when the direction of the electronic device is a second direction, the first content and the second content based on the user input.

7. The electronic device of claim 1, wherein the at least one processor is further configured to:
    detect that the direction of the electronic device is changed, and
    control, in response to a user input on one of the first display area or the second display area, the first content and the second content based on the changed direction of the electronic device.

8. A method of operating an electronic device having a shape-changeable display, the method comprising:
    displaying a first content on the display;
    detecting a touch on the display;
    detecting a shape change of the display that the display is folded and unfolded while the detected touch is maintained on the display;
    dividing the display into a first display area and a second display area based on the detecting of the shape change while the detected touch is maintained;
    displaying the first content on the first display area of the display and a second content associated with the first content on the second display area of the display;
    receiving a user input on the first content displayed on the first display area;
    controlling, when a direction of the electronic device is a first direction, an update to be displayed on the first content, wherein the update is based on the received user input; and
    controlling the update to be simultaneously displayed on the second content displayed on the second display area based on the received user input on the first content displayed on the first display area.

9. The method of claim 8, further comprising:
    identifying the direction of the electronic device in response to the shape change of the display.

10. The method of claim 8,
wherein the second content includes content duplicated from the first content, and
wherein the displaying of the first content and the second content comprises:
    duplicating configuration information for the first content; and
    generating the second content based on the duplicated configuration information.

11. The method of claim 8, wherein the dividing of the display comprises:
    determining a size of the first display area for the first content, and
    determining a size of the second display area for the second content based on the size of the first display area.

12. The method of claim 8, further comprising:
    controlling, when the direction of the electronic device is a second direction, the first content and the second content based on the user input.

13. The method of claim 8, further comprising:
    detecting that the direction of the electronic device is changed, and
    controlling, in response to a user input on one of the first display area or the second display area, the first content and the second content based on the changed direction of the electronic device.

* * * * *